Jan. 10, 1933.  T. A. FEDERWITZ ET AL  1,893,736
CONVEYING SYSTEM
Original Filed July 1, 1925   15 Sheets-Sheet 1
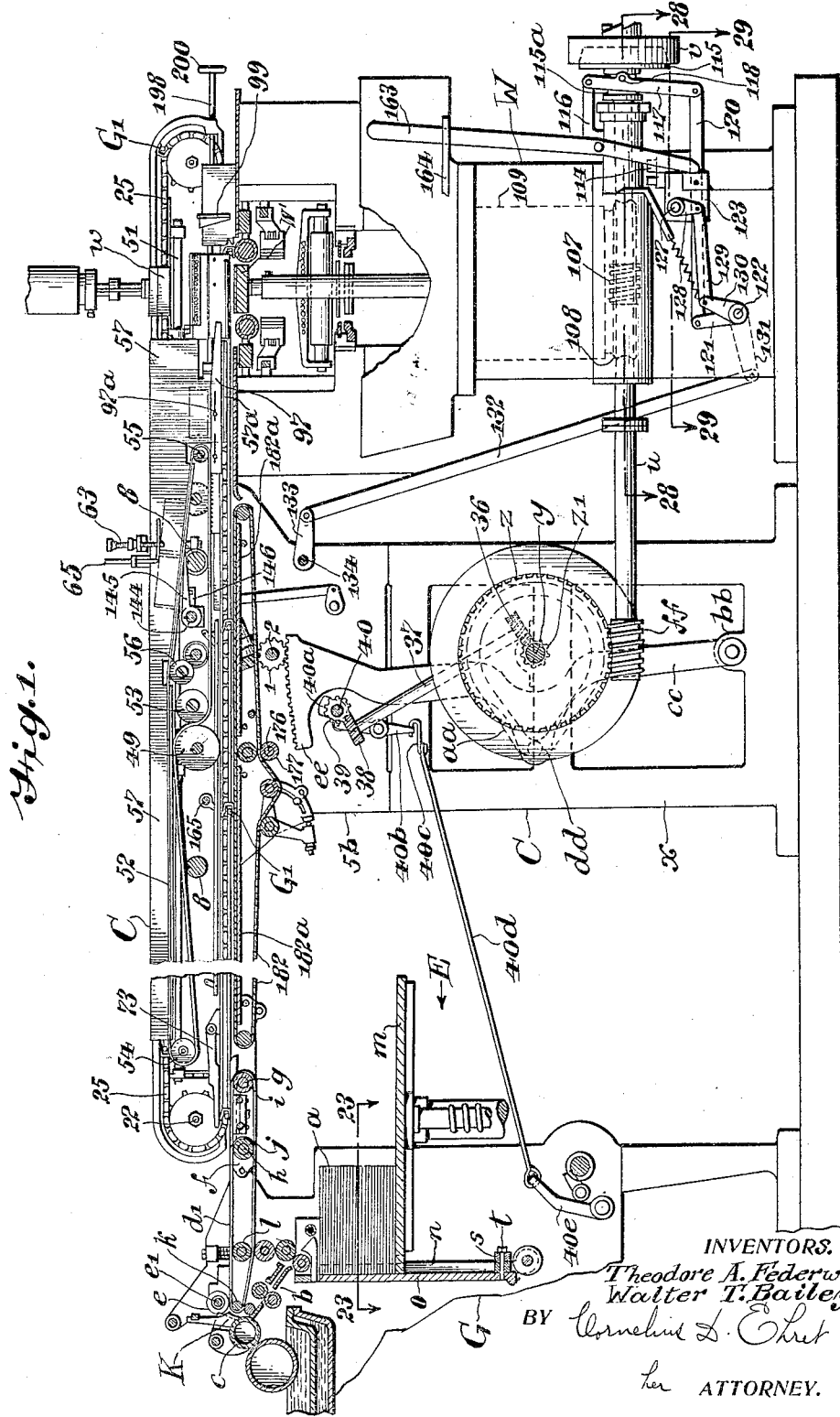
INVENTORS.
Theodore A. Federwitz
Walter T. Bailey,
BY Cornelius D. Ehret
her ATTORNEY.

Jan. 10, 1933.  T. A. FEDERWITZ ET AL  1,893,736
CONVEYING SYSTEM
Original Filed July 1, 1925   15 Sheets-Sheet 2
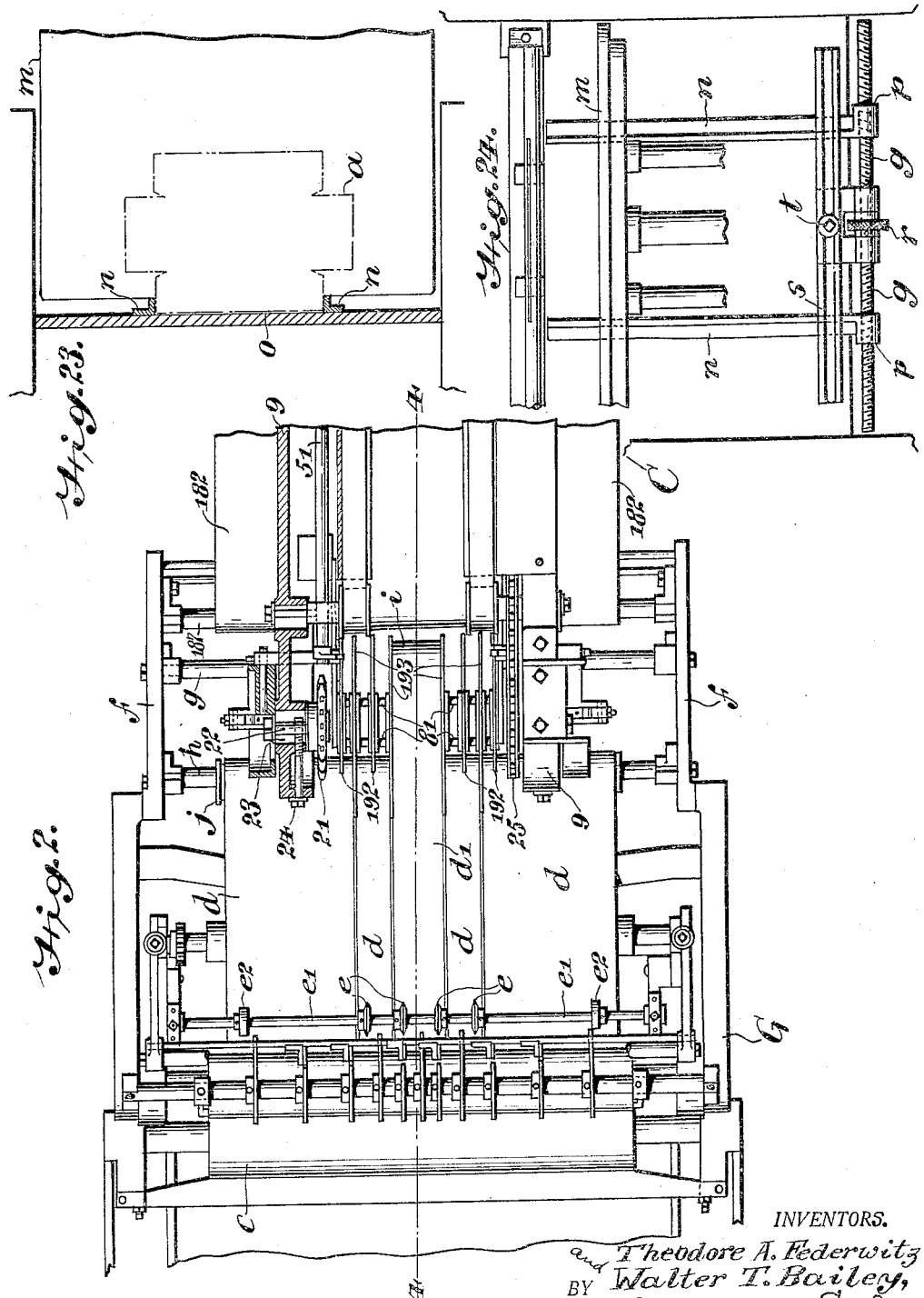
INVENTORS.
Theodore A. Federwitz
BY Walter T. Bailey,
Cornelius L. Ebet
ATTORNEY.

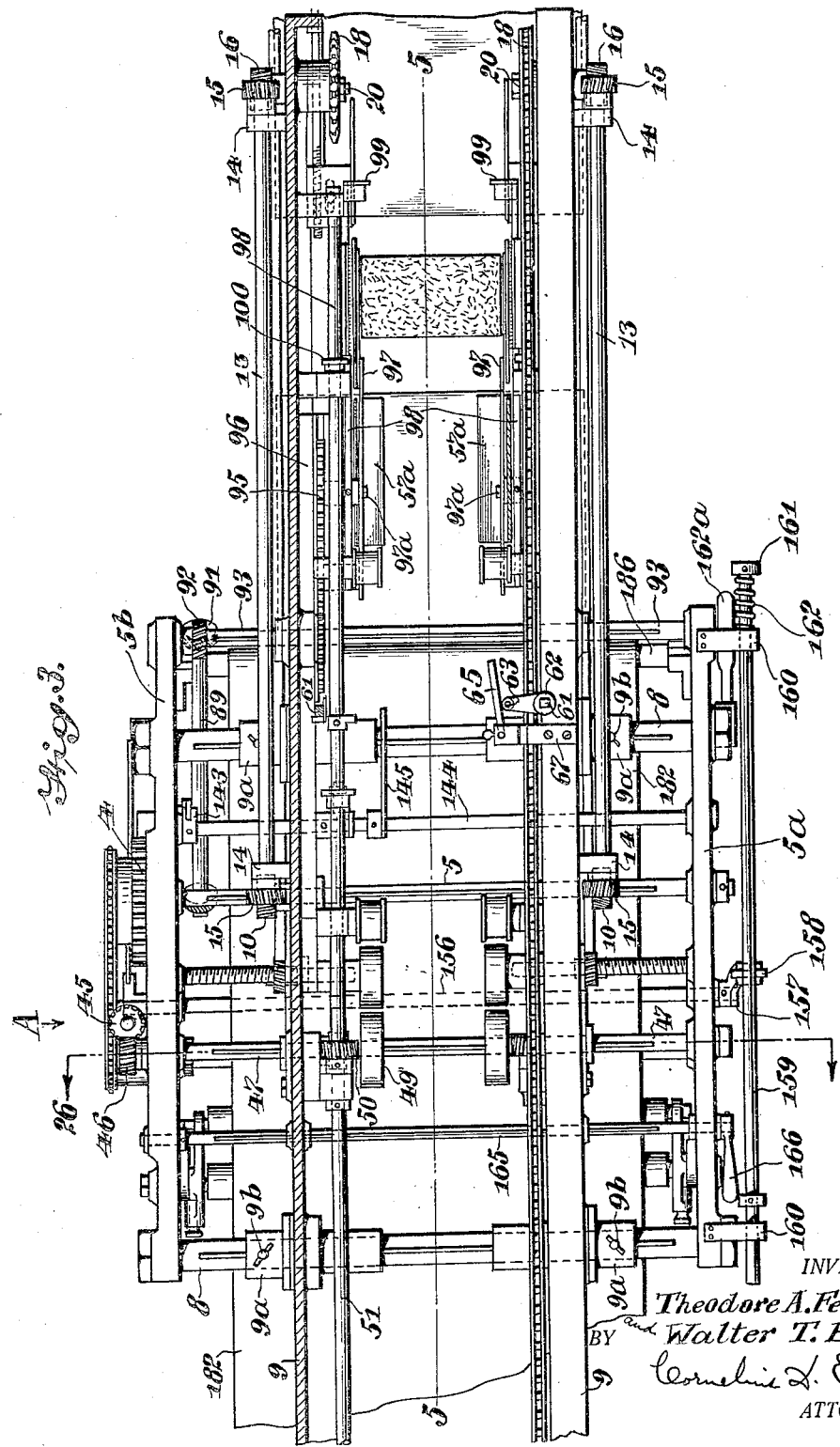

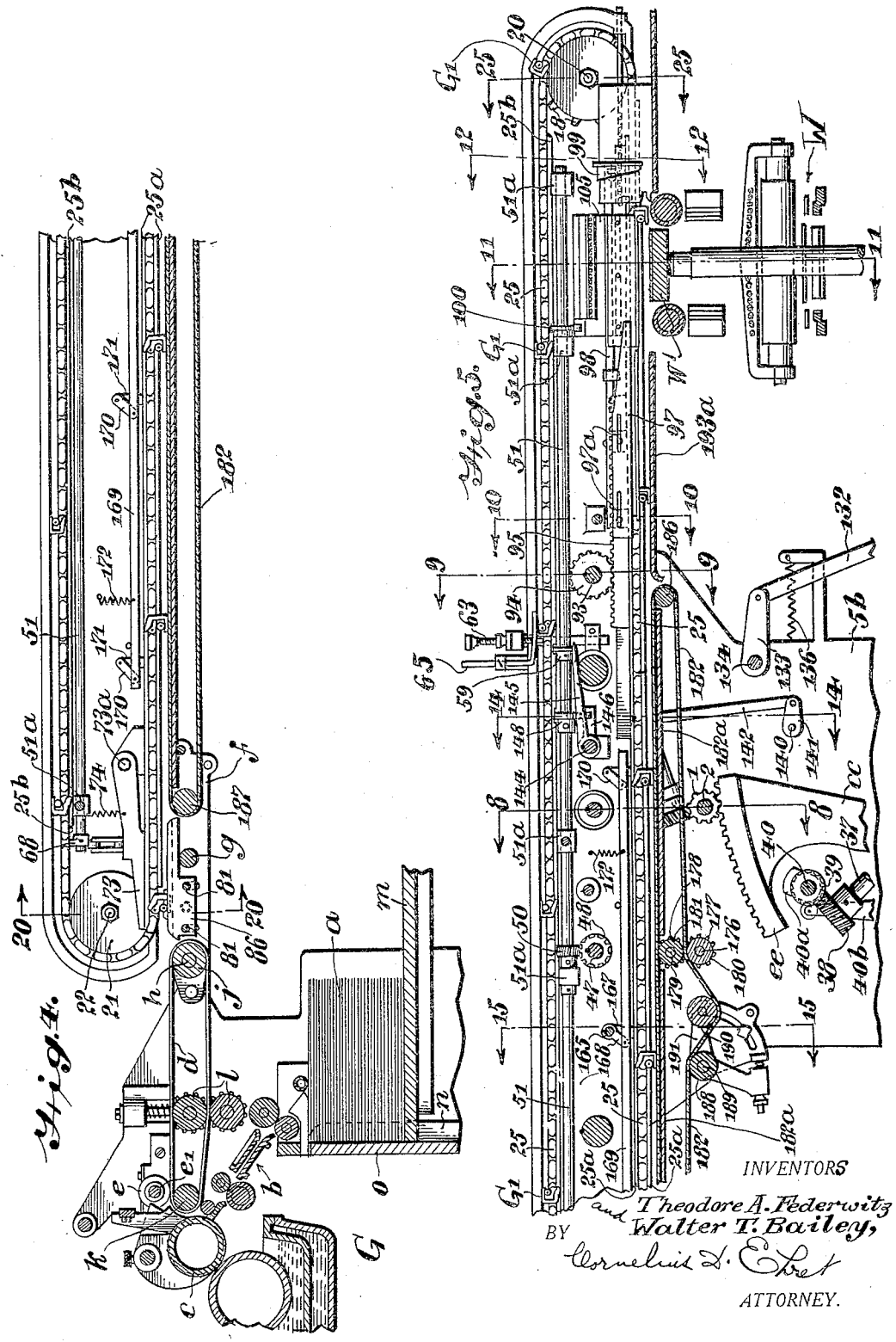

Jan. 10, 1933.  T. A. FEDERWITZ ET AL  1,893,736
CONVEYING SYSTEM
Original Filed July 1, 1925   15 Sheets-Sheet 5
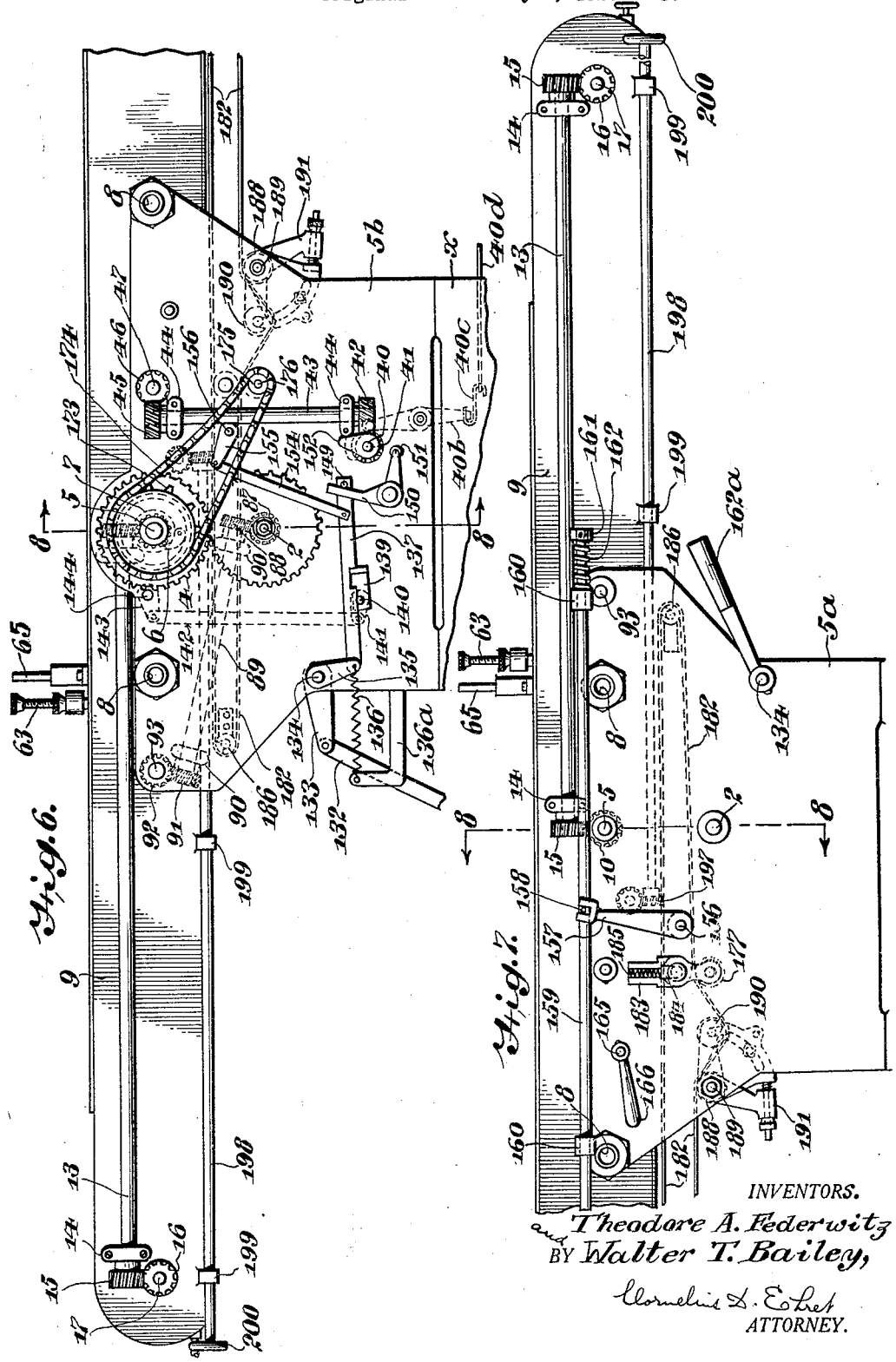
INVENTORS.
Theodore A. Federwitz
and Walter T. Bailey,
BY
Cornelius D. Ehret
ATTORNEY.

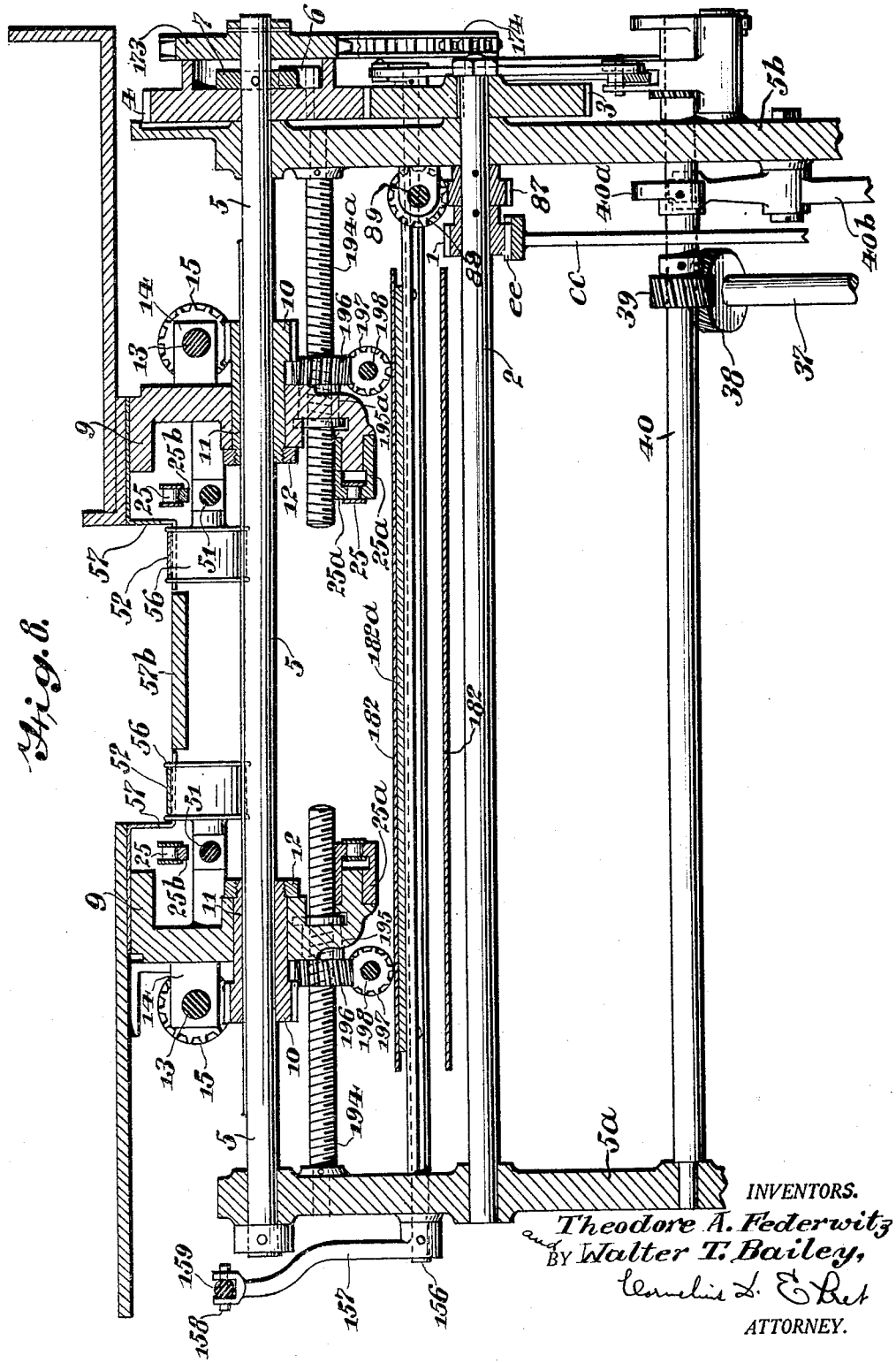

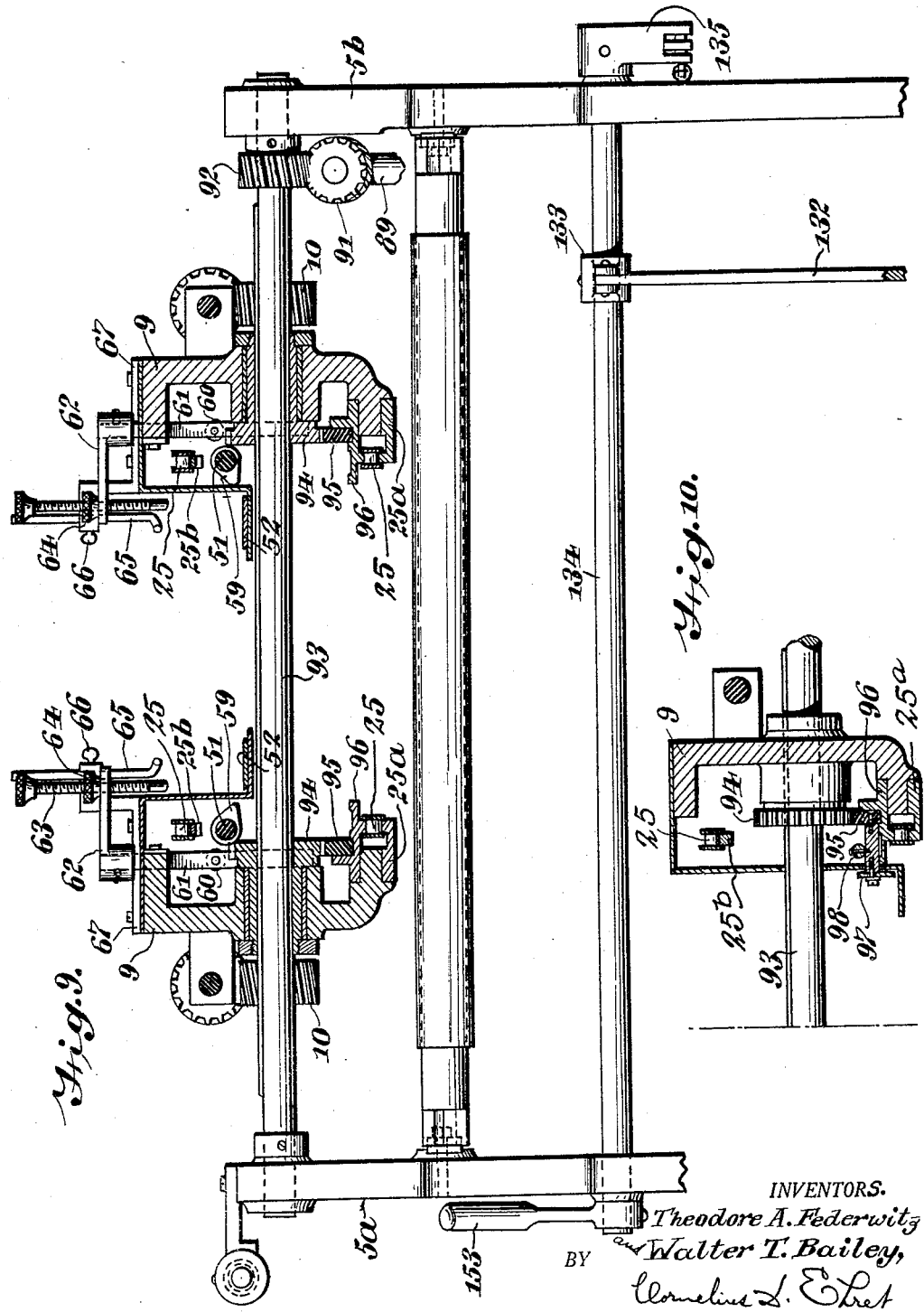

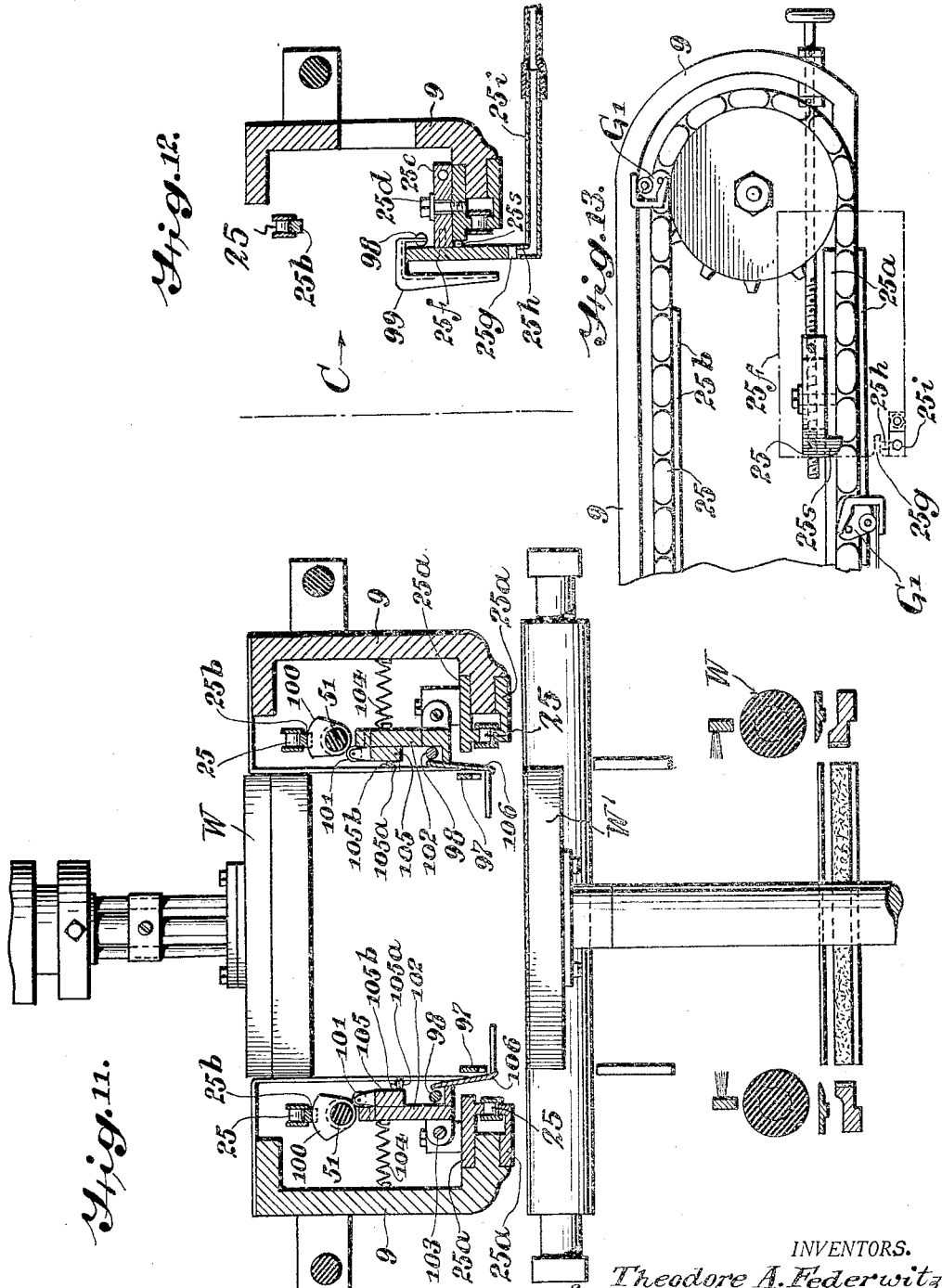

Jan. 10, 1933.  T. A. FEDERWITZ ET AL  1,893,736
CONVEYING SYSTEM
Original Filed July 1, 1925   15 Sheets-Sheet 9
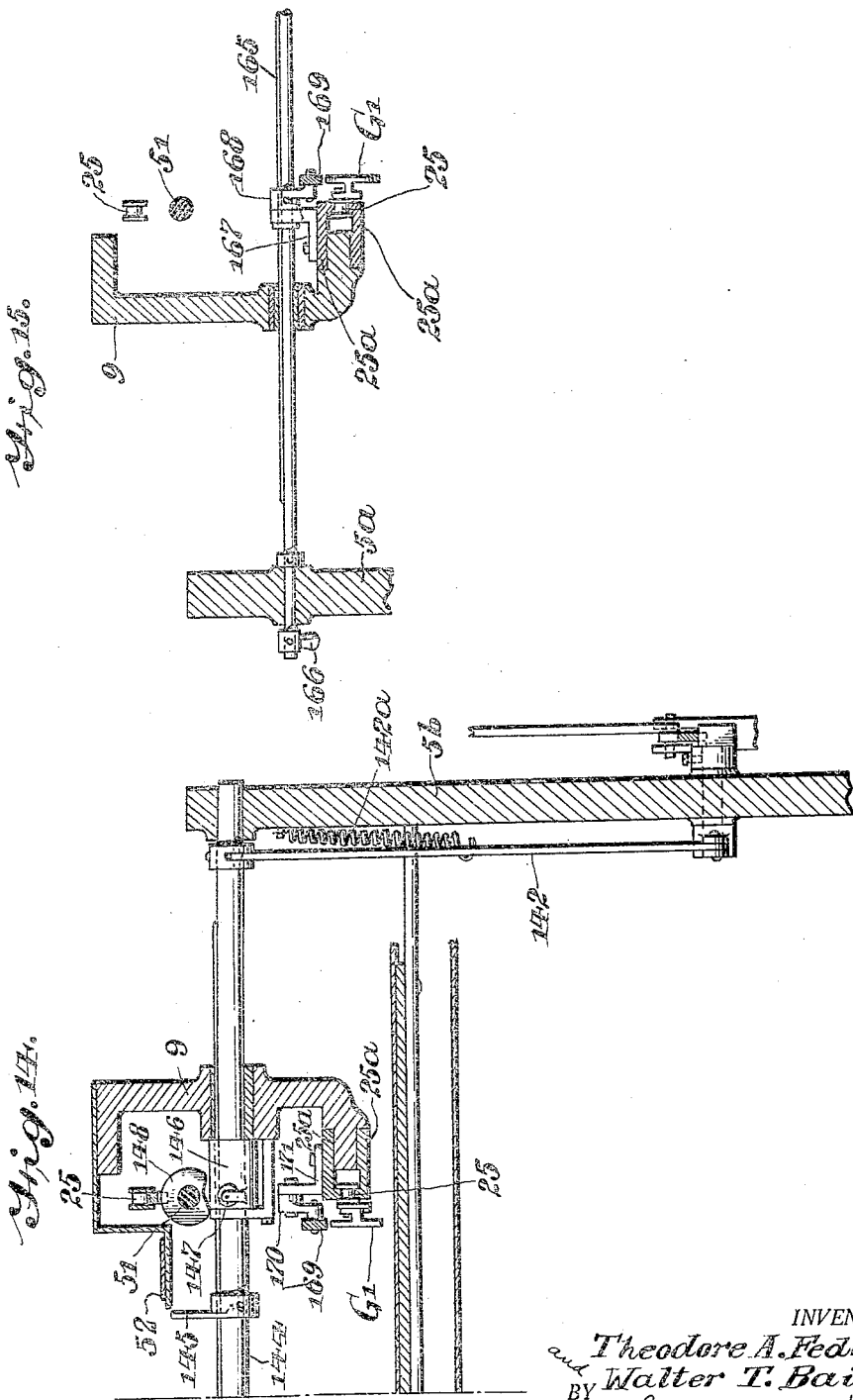
INVENTORS.
Theodore A. Federwitz
and Walter T. Bailey,
BY
Cornelius L. Ehret
ATTORNEY.

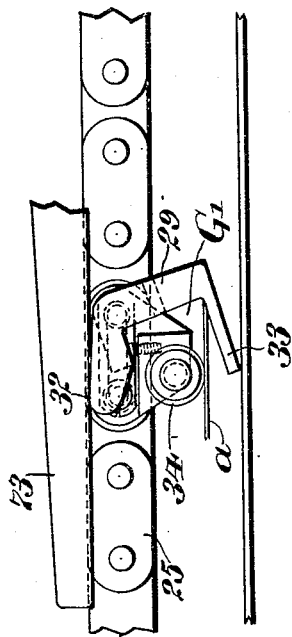
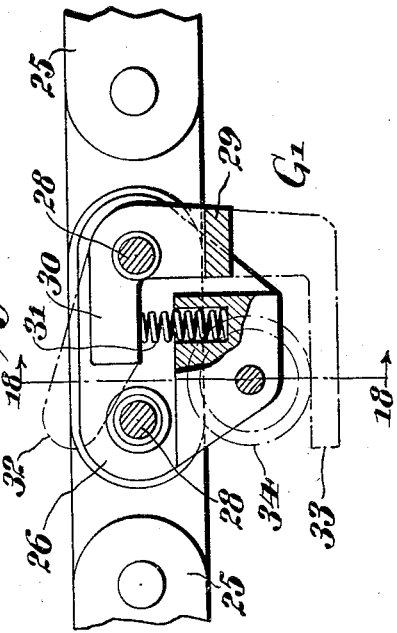
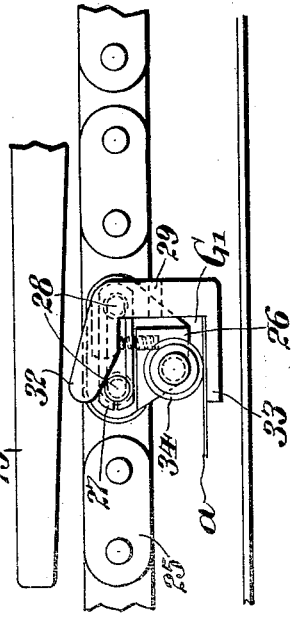
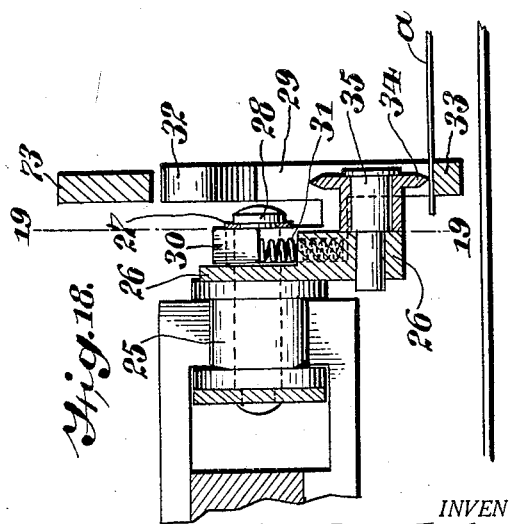
INVENTORS.
*Theodore A. Federwitz*
*and Walter T. Bailey,*
BY
ATTORNEY.

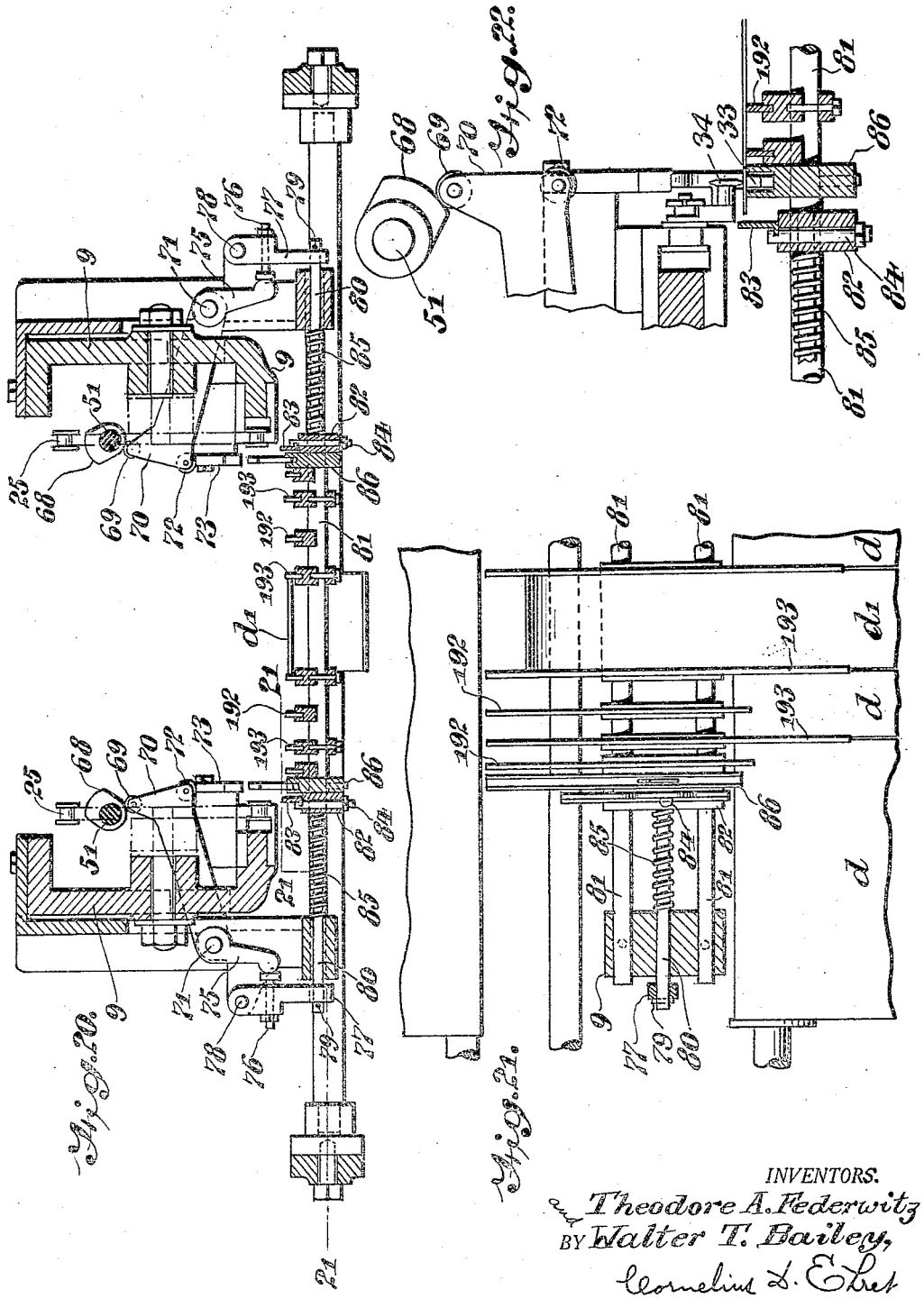

Jan. 10, 1933.  T. A. FEDERWITZ ET AL  1,893,736
CONVEYING SYSTEM
Original Filed July 1, 1925   15 Sheets-Sheet 12
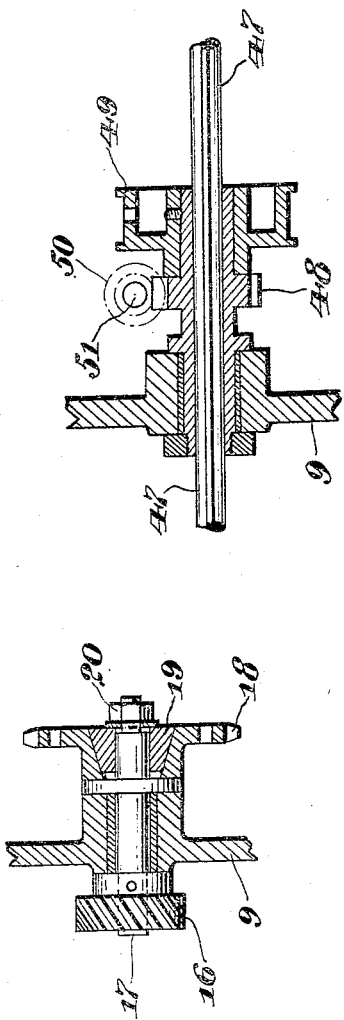
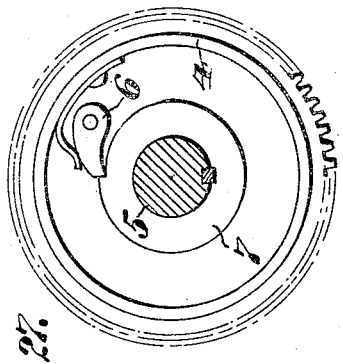
INVENTORS.
Theodore A. Federwitz
and Walter T. Bailey,
BY
Cornelius L. Ehret
ATTORNEY.

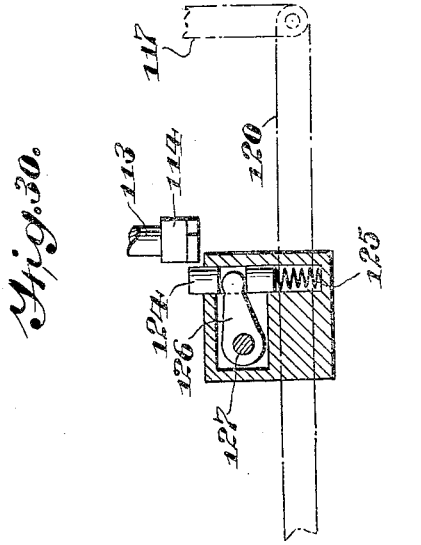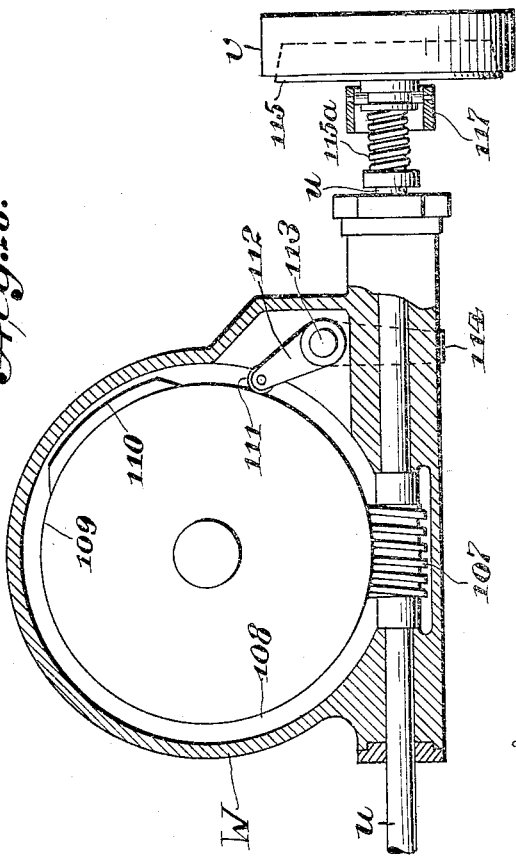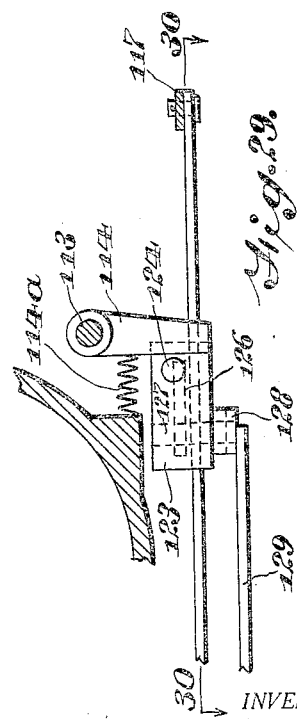

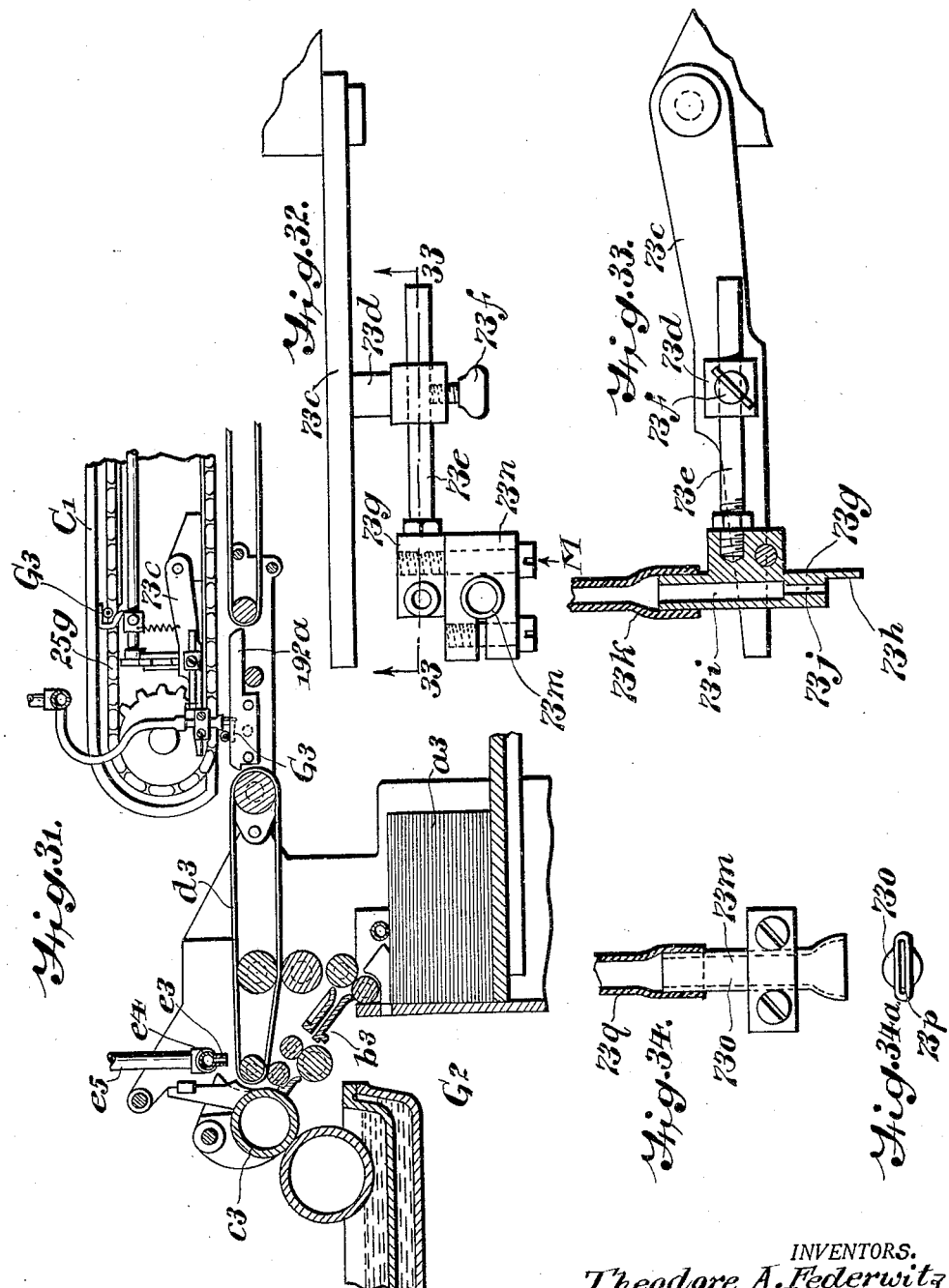

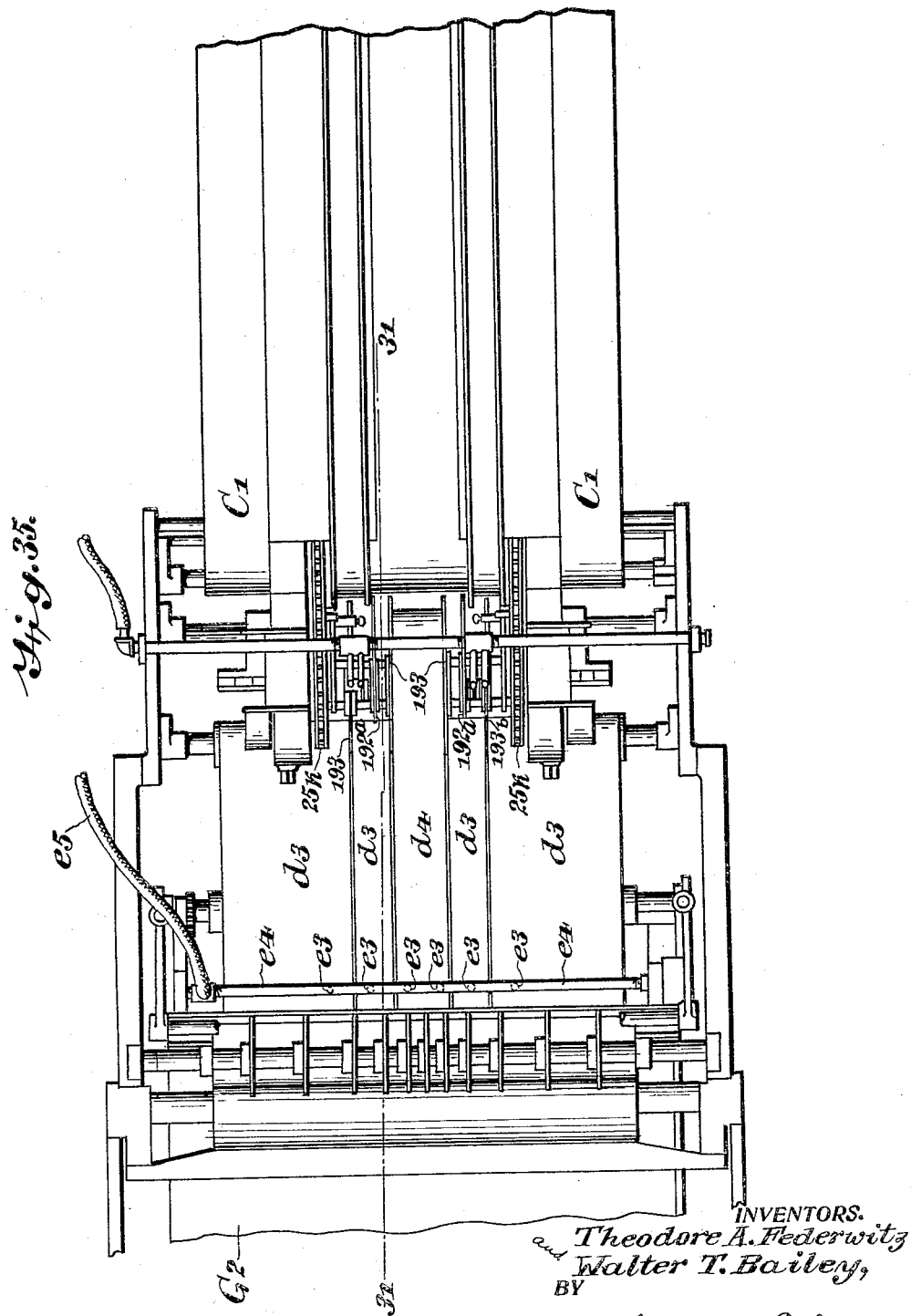

Patented Jan. 10, 1933

1,893,736

UNITED STATES PATENT OFFICE

THEODORE A. FEDERWITZ AND WALTER T. BAILEY, OF PHILADELPHIA, PENNSYLVANIA, ASSIGNORS TO STOKES & SMITH COMPANY, OF PHILADELPHIA, PENNSYLVANIA, A CORPORATION OF PENNSYLVANIA

CONVEYING SYSTEM

Original application filed July 1, 1925, Serial No. 40,769. Divided and this application filed September 25, 1926. Serial No. 137,668.

Our invention relates to the art of feeding wrappers, sheets, labels, or equivalent, hereinafter termed "sheets" or "wrappers", to a machine or unit, as a wrapping machine, a box wrapping or covering machine, a package wrapping machine, a can wrapping machine, or equivalent, hereinafter termed a "wrapping unit", or "wrapping machine", which applies the sheet to any desired structure, as a stayed box, package, can, or equivalent, hereinafter termed a "box", or to a non-stayed box, or equivalent.

In accordance with our invention, a system or combination of units, suitably synchronized or operating in definitely timed relation, automatically and successively deliver sheets, having one surface either partially or wholly coated with a suitable adhesive, as glue, to a wrapping unit in timed relation with the delivery thereto of a box, or a non-stayed box, or equivalent.

Further in accordance with our invention, a sheet stripped from suitable adhesive applying mechanism and accordingly often assuming an arc-shape is manipulated by suitable structure to lie flat, preferably upon the conveyor structure of the adhesive applying unit.

Further in accordance with our invention, a sheet gripper, successively operating to grip and transport glued sheets, is so constructed that different surfaces thereof come into engagement with the successive glued sheets transported thereby, and more particularly the gripper comprises a wheel or disk rotatable to present different surfaces to the glue coated surfaces of successive sheets.

Further in accordance with our invention, sheet grippers of the character aforesaid are comprised in suitable conveyor structure, as sprocket chains, belts or the like.

Further in accordance with our invention, suitable conveyor structure in alignment with sheet delivering structure, as the conveyor belt of a glue applying unit, is intermittently operable to seize and transport in succession individual glued sheets, the conveyor and delivering structure cooperating to align individual sheets transversely of the conveyor structure.

More particularly, adjacent the point of delivery of sheets from the gluer to the conveyor unit, there is pneumatically applied, by air jet or equivalent, to an oncoming glued sheet a force retarding the sheet as it approaches the desired position of alignment.

Further in accordance with our invention, suitable conveyor structure cooperates with suitable release structure to feed individual boxes to the wrapping unit in timed relation to the passage thereto of individual glued sheets; and more particularly suitable mechanism tends to enter the path of box feed at predetermined intervals, and upon failure in the box feed enters the path of feed to disconnect the source of power.

Further in accordance with our invention, there is provided structure for positioning a stack of sheets in advance of application of adhesive thereto, to insure their delivery to the conveyor structure in substantially predetermined position transversely of their movement thereby; and more particularly the stack positioning structure comprises elements adjustable to substantially equal extents with respect to the path of travel of the sheets both in the adhesive applying unit and in the conveyor structure.

Further in accordance with our invention, structure for conveying both sheets and boxes or blanks for non-stayed boxes to a common point of delivery is fully adjustable for manipulating sheets and boxes or blanks of different dimensions.

Further in accordance with our invention, there is correlated with the wrapper-applying structure of a wrapping machine stripper mechanism operating in timed relation with respect to structure for conveying to the wrapping unit sheets or boxes or non-stayed boxes, and movable or adjustable with the adjustable structure of the conveyor mechanism for operation upon boxes or non-stayed boxes of different dimensions; and further our invention resides in the correlation with the form block structure of a wrapping unit of stripper mechanism mounted independently thereof but operating in timed relation therewith.

Our invention resides in the system, apparatus and features of structure hereinafter described and claimed.

The apparatus herein disclosed is of the general character described in prior Letters Patent 1,403,635, January 17, 1922.

This application is in part a continuation of our prior application Serial No. 698,841, filed March 13, 1924, and is a division of our prior application, Serial No. 40,769, filed July 1, 1925.

For an illustration of some of the many forms our invention may take, reference is to be had to the accompanying drawings, in which:

Fig. 1 is a side elevational view, partly in section, of apparatus embodying our invention.

Fig. 2 is a top plan view partly in section of the adhesive applying unit and a part of the conveyor mechanism.

Fig. 3 is a top plan view partly in section of a portion of the conveyor mechanism adjacent the wrapping machine.

Fig. 4 is a sectional view on the line 4—4 of Fig. 2.

Fig. 5 is a sectional view on the line 5—5 of Fig. 3.

Fig. 6 is a side elevational view looking in the direction of arrow A on Fig. 3.

Fig. 7 is a side elevational view looking in the direction of arrow B on Fig. 3.

Fig. 8 is an enlarged vertical sectional view on the line 8—8 of Figs. 5, 6 and 7 looking in the direction of the arrows.

Fig. 9 is an enlarged vertical sectional view on the line 9—9 of Fig. 5 looking in the direction of the arrows.

Fig. 10 is a partial vertical sectional view on the line 10—10 of Fig. 5 looking in the direction of the arrows.

Fig. 11 is a vertical sectional view on the line 11—11 of Fig. 5 looking in the direction of the arrows.

Fig. 12 is a partial sectional view on the line 12—12 of Fig. 5 looking in the direction of the arrows.

Fig. 13 is an elevational view looking in the direction of arrow C on Fig. 12.

Fig. 14 is a partial vertical sectional view on the line 14—14 of Fig. 5 looking in the direction of the arrows.

Fig. 15 is a partial vertical sectional view on the line 15—15 of Fig. 5 looking in the direction of the arrows.

Fig. 16 is an enlarged elevational view of a sheet-gripping unit in closed position.

Fig. 17 is an enlarged elevation of a sheet-gripping unit in open position.

Fig. 18 is a vertical sectional view on line 18—18 of Fig. 19 looking in the direction of the arrows.

Fig. 19 is a view partially in elevation and partially in section taken on line 19—19 of Fig. 18 looking in the direction of the arrows.

Fig. 20 is a vertical sectional view on line 20—20 of Fig. 4 looking in the direction of the arrows.

Fig. 21 is a horizontal sectional view on line 21—21 of Fig. 20.

Fig. 22 is an enlarged vertical partially sectional view on line 20—20 of Fig. 4 looking in the direction of the arrows.

Fig. 23 is a horizontal sectional view on line 23—23 of Fig. 1 looking in the direction of the arrows.

Fig. 24 is an enlarged partial side elevational view looking in the direction of arrow E on Fig. 1.

Fig. 25 is a vertical sectional view on line 25—25 of Fig. 5 looking in the direction of the arrows and showing the locking device for a driving sprocket.

Fig. 26 is a vertical sectional view on line 26—26 of Fig. 3 looking in the direction of the arrows and showing the driving arrangement for one of the one-time shafts and the box-conveying belt.

Fig. 27 is an enlarged elevational view of the arrangement for obtaining uni-directional step-by-step movement of one of the shafts extending transversely of the supporting frames.

Fig. 28 is a horizontal sectional view on line 28—28 of Fig. 1 looking in the direction of the arrows and showing a part of the automatic trip mechanism.

Fig. 29 is a horizontal sectional view on line 29—29 of Fig. 1 looking in the direction of the arrows and showing another part of the automatic trip mechanism.

Fig. 30 is a vertical sectional view on line 30—30 of Fig. 29 looking in the direction of the arrows.

Fig. 31 is a vertical sectional view on line 31—31 of Fig. 35 looking in the direction of the arrows and showing a modified arrangement.

Fig. 32 is an enlarged plan view of a pair of air jet tips.

Fig. 33 is a view partly in vertical section on line 33—33 of Fig. 32 looking in the direction of the arrows.

Fig. 34 is an elevational view looking in the direction of arrow M on Fig. 32.

Fig. 34a is a bottom view of an air jet tip.

Fig. 35 is a plan view of the structure of Fig. 31.

Referring to Fig. 1 there is shown an adhesive applying unit G and a wrapping machine W, or equivalent, as aforesaid. Unit G and machine W are cooperatively related by mechanism which synchronizes the operations or movements of the unit G with the operations or movements of the machine W and by a conveying or transferring unit C delivers to the wrapping machine W boxes, or equivalent, as aforesaid and sheets, or equivalent, as aforesaid, the latter gummed or glued and delivered by the unit G to the transferring unit C.

The adhesive applying unit G may be of any suitable type capable of applying adhesive to sheets of box wrapping paper, or other suitable material, and delivering the gummed sheets in succession at uniform intervals. In the example illustrated, the unit G is of the same general type disclosed in Nitsch and Federwitz Letters Patent No. 1,472,614, granted October 30, 1923, but preferably provided with additional structure for flattening the gummed sheets onto the conveyor belt of the unit G and for centralizing the stack of sheets with respect to the conveyor mechanism, hereinafter described.

The wrapping machine W may be of any suitable character and in the example illustrated in broadly of the type disclosed in prior Letters Patent to Smith 691,329, and more specifically of the type disclosed in prior Letters Patent to Nitsch and Federwitz 1,540,900, and still more specifically of the character disclosed in our prior Letters Patent 1,541,036.

The conveying unit C, however, is of novel construction and is preferably of such form as to constitute a unit which may be added as an attachment to or a bridge for another set of machines or mechanisms, or more particularly to a wrapping machine W, or equivalent, and an adhesive applying unit G, or equivalent.

The adhesive applying unit G is driven at suitable speed by any suitable source of power and operates to move single sheets in succession from the stack $a$ of unglued sheets through the rotary feed roll mechanism designated generally at $b$ and into engagement with the gluing roll $c$ where there is applied, on one side of each sheet, any suitable adhesive, as glue. The sheets after being stripped and deflected from the blue roll $c$ are flattened onto the conveyor belts $d$ and $d1$ of the adhesive applying unit by presser wheels $e$ mounted on a shaft $e1$ journaled in the frame of the unit G and driven by friction wheen $e2$ also mounted on shaft $e1$ in turn driven by the conveyor belts $d$ (Fig. 2). Carried by the frame of the unit G are arms $f$, in which are journaled shafts $g$ and $h$ carrying idler drums or pulleys $i$ and $j$. Adjacent the gluing roll $c$ said frame supports an idler $k$ around which pass the conveyor belts $d$ and $d1$, the belts $d$ passing around the idler $j$ and the belt $d1$ passing around the idler $i$ (Fig. 2), suitably operated drive rolls 1 being provided for driving the various belts, whereby passage of glued sheets is effected from the unit G toward the unit C. It is to be observed that belt $d1$ is longer and extends beyond the belts $d$ toward the conveying unit C for a purpose hereinafter described.

A system of the character hereinafter described is fully adjustable for manipulating sheets and boxes of different dimensions. To the end that sheets of different dimensions may be utilized, table $m$ on unit G receiving and supporting the stack $a$ of unglued sheets is provided with guide members or arms $n$ suitably secured for sliding movement on a plane surface $o$ of the frame of the unit. Arms $n$ may be adjusted toward and from each other in any suitable manner, as by utilizing threaded openings $p$ provided, respectively, with oppositely pitched threads with which cooperates the rod $q$ likewise provided with oppositely pitched threaded portions, a serrated disk $r$, upon manipulation, imparting rotative movement to said rod, (Figs. 23 and 24). It is to be understood that each arm $n$ is spaced substantially an equal distance from a vertical plane passed centrally and longitudinally through the belt structure $d$ and $d1$ and, due to the adjusting arrangement described, arms $n$ always remain at respectively equal distances from that plane. If desirable, arms $n$ may be releasably secured in any adjusted position by a clamp $s$ attached to the frame portion $o$ by bolt $t$.

The unit C comprises a base $x$ supporting the sheet and box conveyor mechanism and associated structure and is provided with bearings for a shaft $y$ carrying a worm gear $z$ and a cam $aa$. Bearings $bb$ an base $x$ pivotally an oscillatory arm $cc$ carrying a cam roller $dd$ substantially intermediate its ends and a gear quadrant $ee$ adjacent its other end. Worm gear $z$ meshes with and is driven by worm $ff$ mounted on and driven by shaft $u$ as hereinafter described.

Oscillatory movement imparted to arm $cc$ in turn oscillates gear 1 keyed to shaft 2. Gear 3 likewise keyed to shaft 2 (Fig. 6) meshes with gear 4 freely rotatable on shaft 5 disposed in bearings in supporting frames $5a$ and $5b$ carried by the frame $x$, the supporting frames also providing bearings for the shaft 2. A pawl 6 pivoted to gear 4 engages a one toothed ratchet 7 keyed to shaft 5 (Fig. 27), imparting rotative movement thereto during rotation of gear 4 in one direction and upon reversal of the direction of rotation of gear 4, pawl 6 rides over the now stationary surface of ratchet 7. In this manner oscillatory rotative movement applied to gear 2 causes intermittent, step-by-step rotation of shaft 5 always in the same direction.

Supporting frames $5a$ and $5b$ are tied together by supporting members 8 serving to support and guide conveyor frames 9 mounted on said members 8 by sleeves $9a$ forming elongated bearings for the conveyor frames, which may be adjusted longitudinally of members 8 as hereinafter described and fixed in adjusted position by set screws $9b$ (Fig. 3).

The sheet conveyor mechanism

Gears 10 respectively mounted in bearings in the conveyor frames 9 (Fig. 8) are provided with sleeves 11, each splined to shaft 5 and held in position in the bearings by collars 12. A pair of shafts 13 (Figs. 6 and 7) respectively rotatable in bearings 14 on conveyor frames 9 are provided adjacent each end with gears 15. One shaft 13 is disposed exteriorly of one of the conveyor frames 9 and the other is disposed exteriorly of the other conveyor frame (Fig. 8), each shaft extending in the same direction longitudinally of and toward the wrapping machine end of the conveyor frames. Gears 15 on the ends of the shafts 13 adjacent the shaft 5 mesh with gears 10 aforesaid while the gears 15 on the ends of the shafts 13 adjacent the wrapping machine mesh with gears 16 keyed to studs 17 rotatably mounted in bearings in the conveyor frames 9 (Figs. 6 and 7), each stud carrying a drive sprocket 18 adjustably secured thereto by a tapered plug 19 and a nut 20 (Fig. 25). Rotatably mounted on the conveyor frames 9 adjacent the unit C are the idler sprockets 21 mounted on studs 22 lying in slots 23. If desired, each stud may be provided with a threaded opening receiving a screw 24 (Fig. 2) which upon proper adjustment will shift the studs longitudinally of the conveyor frames to tighten the sprocket chains 25, belts, or equivalent, mounted, respectively, on the pairs of sprockets 18 and 21. Suitable chain guides or supports 25a (Fig. 8) are disposed adjacent the bottom of conveyor frames 9 for supporting and guiding the chains while moving toward the wrapping machine W, bars 25b mounted as hereinafter described respectively supporting and guiding the chains in their path of travel toward the unit G.

Spaced equidistantly along chains 25 parallel to a vertical plane extending at right angles to the longitudinal axis of the conveyor frames 9 are the pairs of sheet gripper units designed generally at G1 (Figs. 1 and 16 to 19, inclusive), the distance along each chain 25 between neighboring gripper units being at least as great and somewhat greater than the maximum width of sheet to be operated upon. Each gripper preferably takes the place of a side link of one of the chains and comprises a plate bracket 26 secured by spring clamp 27 to chain link pins 28, one of which forms a bearing for each gripper palm 29, provided with the tail 30 engaged by a spring 31 seated in a recess of the plate bracket 26, and, therefore, constantly urged in one direction.

Gripper palm 29 also is provided with an arm 32 for a purpose hereinafter described and with a palm proper 33, the sheet eventually being gripped between the latter and a knife-edged surface 34, preferably a circular disk or wheel rotatably mounted on a stud 35 in the plate bracket 26.

In operation, the oncoming glued sheet is brought forward by the conveyor mechanism of the unit G and is thrust against the vertical portion of a pair of gripper palms 29. Should the sheet be laterally displaced with respect to a line extending at right angles to the longitudinal axis of the unit C, its advanced corner will meet and be abruptly stopped by one of the gripper palms 29 whereupon the lagging corner will be carried forward into engagement with the other transversely aligned gripper palm by the continuously rotating belts $d$ and $d1$ which still engage and slip under the bottom surface of the glued sheet. The sheet may perhaps be of such narrow width that it will have passed beyond the belts $d$ in which case the longer belt $d1$ still slipping under the bottom surface of the sheet will perform the aligning function, the result being that the sheet is caused to assume its proper position, i. e., one in which its forward edge is parallel to a line extending at right angles to the longitudinal axis of the unit C. However, if for any reason the sheet is still not properly aligned, the pivoted gripper palms 29 upon release of the gripper operating members, hereinafter described, will travel in the arcs of a circle toward the left (Fig. 17) and cause proper alignment by thrusting an advanced corner of the sheet a small distance backward toward the unit G.

The member 34, as stated, is preferably circular and is provided with an edged surface for effecting clamping engagement with the glued sheet (Fig. 18). In normal operation and due to the rotatable mounting of members 34, it usually happens that the same portion of the periphery of this member does not successively engage the glued surfaces of succeeding sheets. For example, in Fig. 16, a sheet has been gripped between member 34 and gripper palm 29 and this sheet will be transferred to a point of release by the conveyor chains whereupon the empty gripper unit G1 will return for another sheet. During the course of its travel, member 34 will be rotated, perhaps by frictional engagement with the glued surface of the sheet when entering and leaving the gripper. At any rate, it usually happens that the rotatable member 34 of the empty gripper unit when in position to receive a freshly glued sheet is in a different position from that assumed in transferring the preceding sheet. In this manner glue or other adhesive adhering to the member 34 at any one point usually will dry and peel before that point functions to again grip a sheet.

Although we have illustrated and described the unit G1 as being used with a sprocket chain and being in effect an integral part thereof, it is to be understood that gripper units of this character are not limited to use in this manner, but are capable of use in other types of apparatus, and with supporting members other than sprocket chains.

Sheet gripper release mechanism

Shaft 5 rotating uni-directionally and step-by-step, as aforesaid, imparts uni-directional rotative movement to the sprockets 18. In this manner the chains 25 and units G1 move step-by-step successively carrying individual sheets from the unit G toward the unit W. When a sheet has been suitably positioned with respect to the wrapper-applying mechanism, for example, when it has been brought to position below the upper form block structure $w$ and above the lower form block or platen $w1$ of the unit W, a combined arrangement operates to release the sheet gripper, to temporarily hold the released sheet and to guide ejected boxes. To this end, slotted gripper release members $25c$ having downwardly extending cams $25s$ are slidably clamped respectively to the conveyor frames 9 by bolts $25d$. The position of cams $25s$ with respect to said frames is controlled by screws $25e$ mounted thereon and threaded in the gripper release members, the degree of adjustment in each case depending upon the width of the sheets passing through the machine. It is to be understood that cams $25s$ are maintained parallel to a vertical plane extending at right angles to the longitudinal axis of the conveyor frames and operate respectively to release the glued sheet by depressing arms 32 of the gripper units G1 when said arms in their travel come in contact with the respective cams $25s$. Sheet holding plates $25f$ secured to each gripper release member $25c$ and movable therewith have slots $25g$ opening into suction holes $25h$ in their lower surfaces communicating with suction pipe $25i$ leading to a suitable suction pump (not shown). When being released from the unit G1, as aforesaid, the forward edge of the glued sheet enters slots $25g$ where it is temporarily held by suction until the upper form block structure $w$ descends. It is to be observed that the inner surfaces of the sheet holding plates $25f$ form a guide channel through which the ejected boxes pass (Figs. 12 and 13).

The one-time mechanism

A pair of cam-carrying shafts, hereinafter specifically described, are journaled in the conveyor frames 9 substantially parallel to each other and to the conveyor frames and are so correlated with the driving mechanism of the wrapping machine W that one rotation of each is effected in response to one cycle of the wrapping machine W. These shafts in turn control certain instrumentalities and, therefore, the time of actuation of such instrumentalities is dependent upon the position of the operating parts of the wrapping machine.

Proceeding to a description of the arrangement for operating said shafts and referring to Fig. 1 wherein the shaft $y$ of the unit C is shown as carrying a spiral gear $z1$ engaging a spiral gear 36 keyed adjacent one end to a shaft 37 mounted in bearings in the supporting frames $x$ and $5b$, the latter shaft adjacent its other end carrying a spiral gear 38 meshing with a corresponding spiral gear 39 keyed to shaft 40 mounted in bearings in the supporting frames $5a$ and $5b$. A spiral gear 41 keyed to shaft 40 meshes with a spiral gear 42 carried by shaft 43 mounted in bearings 44 on the exterior of the supporting frames $5b$ (Fig. 6). Adjacent its other end shaft 43 carries a spiral gear 45 meshing with a spiral gear 46 keyed to shaft 47 likewise mounted in bearings in the supporting frames $5a$ and $5b$. Gears 48 mounted in bearings in the conveyor frames 9 and splined to shaft 47 mesh respectively with gears 50 keyed to shafts 51, hereinafter referred to as one-time shafts, disposed longitudinally of the frame in bearings $51a$ (Figs. 3 and 26), the latter supporting bars $25b$ in turn respectively supporting chains 25 when traveling toward the unit G. It is to be understood, however, that the spiral gears $z1$ and 36, the shaft 37 and the train of shafts and gears as described aforesaid leading to and including gears 51 are in reality one-time shafts, and, if desired, suitable controls may be effected by any part or parts of this train and such controls will be actuated in synchronism with the operating parts of the wrapping machine W.

Synchronizing mechanism for the unit G

Secured to shaft 40, which as stated aforesaid rotates once during each cycle of the wrapping machine W, is a cam $40a$ which rocks a bell crank lever $40b$ pivoted to supporting frame $5b$ (Fig. 1). A hook $40c$ is fastened to a rod, link, or equivalent $40d$ pivoted adjacent its other end to a lever $40e$, movement thereof causing a cycle of operation of the unit G whereby a sheet is glued and delivered to the belt structure of said unit G. It is to be understood that cam $40a$ is so positioned on shaft 40 that the unit G will be successively actuated at proper times to eventually cause individual sheets to reach the wrapping machine W at the proper time for coaction with the form block structures $w$ and $w2$.

The box conveying mechanism

Pulleys 49 secured respectively to gears 48 (Fig. 26) respectively drive box conveying belts 52, bands, or equivalent, continuously, an idler pulley 53 keeping each belt in engagement with the drive pulley 49 (Fig. 1). Belts 52 pass over the front and rear idler pulleys 54 and 55 and intermediate idler pulleys 56 (Figs. 1 and 8). Angular members 57 disposed on the conveyor frames 9 serve as supports for the box conveying belts (Figs. 1 and 8) and also a guide channel for the boxes which are placed on the belt by an attendant, or conveyed thereto by suitable conveyor mechanism from a source of supply (not shown), the direction of belt rotation being such that the boxes move toward the machine W in a single column, each box in turn engaging certain release mechanism intermittently operable to permit renewed passage of a box toward the said machine W at the proper period in each cycle of operation. If desired, a guard plate 57b may be disposed between the horizontal portions of members 57 below belts 52, the guard plate serving to prevent the boxes from falling into the space between the conveyor frames (Fig. 8).

*The box feed mechanism*

Cams 59 on the one-time shafts 51 respectively engage rollers 60 on vertically reciprocatory rods 61 guided and supported in the conveyor frames 9 (Fig. 9). Rods 61 carry arms 62 threaded to receive adjustable release pins 63 held in adjusted position by lock nuts 64 whereby boxes of different dimensions may be accommodated. It is to be understood that cams 59 will be positioned on one-time shafts 51 so as to raise the release pins once in the cycle of operation of the machine W such that the box after passing beneath the release pins will eventually reach the machine W at the proper time to be engaged by the form block structures W and W¹.

Disengagement of individual boxes from release pins 63 is effected by stripper rods 65 adjusted to conform with the position of release pins 63 and held in adjusted position by set screws 66, the rods mounted respectively on brackets 67 suitably supported on the conveyor frames 9.

*Gripper actuating mechanism*

Cams 68 mounted, respectively, on the one-time shafts 51, engage the respective rollers 69 carried, respectively, by levers 70, each fixed on a shaft 71 rotatably mounted in a conveyer frame 9, Figs. 20 and 22. A roller 72 on each lever 70 spaced from roller 69 engages a gripper-operating member 73 pivoted at 73a in a conveyer frame 9, each member 73 being biased into engagement with a roller 72 by a spring 74, Figs. 4, 20 and 22.

Secured respectively to shafts 71 are the toe levers 75, each at one end engaging a screw 76 adjustable in a fork lever 77, which, as illustrated in Fig. 20, is pivoted to a conveyer frame 9 at 78. The forked end of each lever 77 engages a pin 79 mounted adjacent the end of a rod 80 slidable in a conveyer frame 9 and received in the forked end of a lever 77. Slidable on guide rods 81 carried by the conveyer frames 9 are the side registering gage holders 82, each supporting a gage 83 held in adjusted position by a clamp bolt 84 or the like, Figs. 20 and 21. Encircling each rod 80 is a helical spring 85, Figs. 20, 21 and 22, utilizable for biasing a gage holder 82 and its gage 83 toward the longitudinal center of the conveyer unit C. Once for each cycle of operation of the herein disclosed system, the ends of levers 75 are moved outwardly, Fig. 20, under the influence of cams 68 on one-time shafts 51, thereby moving the gage holders 82 from the longitudinal axis of the conveyer unit C against the expansive force of the respective helical springs 85. This occurs prior to the delivery of a glued sheet to the awaiting pair of sheet grippers at the receiving end of the conveyer unit C. After the glued sheet has been deposited in said sheet grippers, but before the grippers jaws 33 close thereon, cams 68 move beyond roller 69 and helical springs 85 move gage holders 82 toward the longitudinal axis of the conveyer unit C, and in so doing, if the sheet is displaced laterally of the conveyer unit C, one gage 82 or the other, or both, engages or engage a side or sides of the sheet to align the same with respect to said longitudinal axis of the conveyer unit C.

In the region of sheet discharge from the belts of the unit G, there may be provided troughs 86, Fig. 22, supported by rods 81 and having their upper surfaces in horizontal alignment with the guiding members 192. When a pair of sheet grippers G1 has been moved into sheet-receiving position at the receiving end of the conveying unit C, operation of the gripper-operating member 73 causes descent of gripper jaws 33 into the respective troughs 86. Thereafter, the glued sheet is delivered along the guide members 192 and the upper surfaces of troughs 86 into a position above the gripper jaws 33, the ends of the latter subsequently swinging upwardly under the influence of the springs comprised in the respective gripper units G1 to grip a sheet between the same and the disk 34.

*Box pusher bar mechanism*

Referring to Fig. 6, spiral gear 87 keyed to shaft 2 meshes with spiral gear 88 keyed to shaft 89 mounted in bearings 90 on the supporting frame 5b. Spiral gear 91 likewise keyed to shaft 89 adjacent its other end meshes with spiral gear 92 keyed to shaft 93 mounted in bearings in the frames 5a and 5b.

Gears 94 provided with sleeves rotatably mounted respectively in the conveyor frames 9 are splined to shaft 93 and mesh respectively with racks 95 slidable in tracks 96 likewise mounted in the conveyor frames (Figs. 9 and 10). Box pusher bars 97 are adjustably secured to the respective rack structures by pin-and-slot connections 97a, and the oscillatory rotative movement imparted to shaft 93 through the chain of connections from arm *cc* imparts alternate movement of the box pusher bars toward and from the form block structure *w* and *w*1. As shown in Fig. 1, these bars are in the advanced position toward said form block structure and while remaining momentarily stationary a box is fed down and comes to rest on their upper surfaces. Upon retraction of the rods, the box drops onto shelves 57a formed integral with member 57 (Fig. 3) from where it is pushed by the pusher bars under the form block structure in timed relation to the movements thereof.

Ejector rods 98 secured to the respective rack structures and movable therewith are provided adjacent their ends with ejecting palms 99 to eject boxes stripped from the form block structure of the machine W.

*Box stripping mechanism*

Cams 100 mounted respectively on the one-time shafts 51 (Fig. 11) engage rollers 101 carried respectively on plates 102 pivoted to the respective conveyor frames 9 at 103 on either side of the path of travel of the upper form block structure *w*, each plate moving against a retractive spring 104. A stripper brush bracket 105 is adjustable vertically on each plate 102 and comprises a longitudinally extending row of bristles 105a resting beneath a reinforcing bar 105b. Plates 102 also respectively carry flexible box receiving plates 106 spaced beneath each row of bristles.

As shown in Fig. 11, pusher bars 97 will advance the sides of a box into engagement with the flexible plates 106 and the latter will temporarily hold the box until engaged by the upper form block structure *w* whereupon the plates will yield and permit downward passage of the box. While remaining lowered in the machine W, cams 100 rock the plates 102 and in so doing the receiving plates 106 are moved away from, and the stripper bristles 105a into, the path of travel of the box on the upper form block structure *w*. In this manner, the box will rise unimpeded by the plates 106 and be stripped from the plunger by bristles 105a, whereupon it will fall onto the lower platen from whence it is ejected by the rods 98. In performing the stripping operation, bars 105b restrain the bristles from yielding unduly whereby the box is more readily stripped from the upper form block structure *w*.

*Stopping mechanism effective upon failure of box supply*

The drive pulley *v* of wrapping machine W is driven by any suitable source of power (not shown) and through the shaft *u*, power is transmitted to the units C and G for effecting the various driving arrangements of the unit C. Referring to Figs. 1, 28, 29 and 30, shaft *u* carries worm 107 meshing with worm gear 108 carrying cam 109 centrally mounted in the frame of the wrapping unit and making one revolution for each cycle of the unit. Strap 110 on cam 109 engages roller 111 carried by lever 112 keyed to shaft 113 to which a pawl 114 is likewise keyed and engaged by a spring 114a to hold roller 111 against cam 109. The movable clutch element 115 splined to shaft *u* is urged into engagement with the drive pulley *v* in any suitable manner, as by spring 115a. A bracket arm 116 mounted on the frame of the wrapping machine W carries a pivotally mounted clutch lever 117 having pins 118 engaging movable clutch element 115. Link 120 pivoted to lever 117 is connected adjacent its other end to lever 121 pivoted to shaft 122 mounted in bearings in the frame of the wrapping machine W. A trip block 123 secured to link 120 carries a trip pin 124 normally held in one position by a spring 125 (Fig. 30). A pawl 126 secured to shaft 127 is mounted in the trip block 123 and is adapted to actuate the trip pin 124.

When spring 125 is in its expanded position, pin 124 extends upwardly above the surface of trip block 123 (Fig. 30), and when the pawl 114 is rocked by strap 110 it will engage the pin 124 and the trip block will be shifted bodily toward the left (Fig. 30) thereby rocking lever 117 to withdraw the clutch element 115 against spring 115a and disengage shaft *u* from the source of power. However, if pin 124 is withdrawn into trip block 123, pawl 114 will oscillate freely without affecting the trip block and operation of the machine will continue. It becomes apparent, therefore, that the position of pin 124 governs the operation of the machine.

The position of pin 124 may be regulated in any suitable manner depending on the character of the control desired and in the example illustrated, operation or non-operation of the machine is determined by the presence or absence of a box in a predetermined position on the box conveyor belt.

To this end shaft 127 supporting pawl 126 carries a lever 128 pivoted to link 129 in turn pivoted adjacent its other end to lever 130 keyed to shaft 122 (Fig. 1). On the opposite side of the machine W, lever 131 secured to shaft 122 is pivoted to link 132 pivoted adjacent its other end to lever 133 secured to shaft 134 mounted in bearings in the supporting frames 5a and 5b (Figs. 1, 6 and 9). A lever 135 is secured to shaft 134 exteriorly of the supporting frame 5b and a spring 136 secured at one end to the lever 135 is attached to a bracket 136a on the supporting frame 5b (Fig. 6) and cooperates with spring 125 to move the trip pin 124 into the path of travel of pawl 114.

Referring to Fig. 6, trip link 137 having a notch 138 is pivoted to lever 135 and in engagement with the notch is a latch 139 fixed to shaft 140 mounted in a bearing in the supporting frame 5b. A lever 141 also secured to shaft 140 is pivoted to a link 142, a spring 142a (Fig. 14) secured to said link and the supporting frame 5b tending to draw link 142 upwardly (Fig. 6). Link 142 adjacent its other end is pivoted to lever 143 secured to shaft 144 mounted in bearings in the supporting frames 5a and 5b, the shaft 144 carrying a laterally adjustable tell-tale lever 145 (Figs. 1, 6, 14 and 15).

A cam lever 146 pivotally mounted in that conveyor frame 9 adjacent the frame 5b and splined to shaft 144 (Fig. 14) carries a cam roller 147 actuated by a cam 148 on one of the one-time shafts 51, in the example shown, the one-time shaft 51 adjacent the frame 5b.

A pin 149 on trip link 137 engages a bell crank lever 150 pivoted in the frame 5b (Fig. 6), the bell crank adjacent its other end carrying cam roller 151 engaging cam 152 on shaft 40.

The tell-tale lever 145 secured to shaft 144 constantly tends to rise above the plane of the box conveying belts due to the tension exerted by spring 142a transmitted thereto from link 142, upward movement normally being prevented, however, by cam 148 when its high point is in engagement with the cam lever 146 likewise secured to shaft 144. However, when the low point of said cam is in the position shown in Fig. 14, and this is arranged to occur while cam 59 is disengaged from roller 60 (Fig. 9), so that a box, if present, will be held by the release pins 63, upward movement of the tell-tale lever will depend solely on the presence or absence of a box beneath said release pins 63.

If a box is in position, the top surface thereof will engage the strippers 65 when the bottom surface is engaged by tell-tale lever 145. The effect of spring 142a tending to raise the tell-tale lever is insufficient to cause damage or deformation to the box bottom, and, therefore, under the conditions stated the tell-tale lever will be prevented from rising due to the presence of a box. The result is that latch 139 is not withdrawn from notch 138 and springs 136 and 125 are not rendered effective to raise the stop pin 124 (Fig. 30) and stop the machine.

Should the space above the tell-tale lever 145 be vacant, when cam 148 is on its low point, the tell-tale lever will rise unimpeded, latch 139 will be withdrawn from notch 138, and springs 136 and 125 will become effective to raise the stop pin 124 (Fig. 30) in which case the clutch element 115 will be disengaged and the machine stopped, in the manner described aforesaid.

Since the spring 142a is necessarily of a character that is incapable of exerting a force of large magnitude, it is necessary to overcome the binding engagement between the latch 139 and the walls of slot 138 created by the springs 136 and 125 during the period of time that cam 148 is on its low point and the position of tell-tale lever 145 determined by the presence or absence of a box. To this end, and at that time, cam 152 on shaft 40 is timed to engage roller 151 on bell crank 150 and move trip link 157 slightly toward the right (Fig. 6). As stated aforesaid, shaft 40 is in effect a one-time shaft, i. e., rotating synchronously with shafts 51, and, therefore, cam 152 will always effect link 137 in timed relation with cam 148.

Hand trip mechanism

Link 154 pivoted to trip link 137 is pivoted adjacent its other end to lever 155 secured to shaft 156 mounted in the supporting frames 5a and 5b (Figs. 6 and 7). Exteriorly of frame 5a, shaft 156 carries a lever 157, its forked end engaging pin 158 mounted on rod 159 reciprocatory in bearings 160 on the frame 5a. One end of rod 159 has a collar 161 against which spring 162 engages to hold the rod normally toward the right (Fig. 7).

During operation of the machine, an operator may move rod 159 against spring 162 whereupon trip link 137 will be raised and the machine stopped, in a manner similar to that described aforesaid with respect to the tell-tale lever 145. Normally, however, spring 162 maintains rod 159 ineffective to stop the machine.

If the machine has been stopped, either automatically or manually, as aforesaid, shaft 134 may be actuated against the tension of springs 137 and 125 to move notch 138 of trip link 137 into engagement with latch 139. To this end, there is provided a hand start lever 162a secured to shaft 134 (Fig. 7).

Supplementary hand stop mechanism

Referring to Fig. 1, a lever 163 pivoted to the frame of the wrapping machine W engages trip block 123, which as stated aforesaid is connected through link 120 and clutch lever 117 to the movable clutch element 115. Actuation of lever 163 in a clockwise direction (Fig. 1) effects disengagement of clutch element 115 from pulley v and stops the combined mechanism. If desired, lever 163 may be provided with a ratchet lock device 164 of a well known construction.

Manual gripper releasing device

A shaft 165 mounted in bearings in supporting frames 5a and 5b is provided exteriorly of frame 5a with a hand lever 166 (Figs. 7 and 15). Levers 168 splined to shaft 165 rotatably mounted in bearings 167 on each of the upper members of the chain guides 25a (Figs. 14 and 15) are loosely pinned to bars 169 (Fig. 5). Each bar 169 is mounted for vertical movement above the gripper arms 32 on links 170 pivoted in bearings 171 on the upper members of the chain guides 25a, and is normally biased away from the gripper arms by springs 172.

Should the machine have been stopped, it is necessary to remove any partly dried glued sheets before proceeding further. Under such circumstances, operation of hand operated lever 166 will rotate shaft 165 whereupon bars 169 will engage and open gripper arms 32 against the pressure of springs 31 thereby permitting removal of the undesired sheets.

*The paper supporting belt and associated driving mechanism*

Referring to Fig. 6, shaft 5, which as stated aforesaid rotates step-by-step always in the same direction, carries a sprocket 173, preferably exteriorly of frame 5b, driving sprocket chain 174 engaging sprocket 175 keyed to shaft 176 journaled in the supporting frames 5a and 5b. A gear 177 (Fig. 5) keyed to shaft 176 meshes with a gear 178 keyed to shaft 179 extending parallel with shaft 176 likewise mounted in bearings in the frames 5a and 5b. A pair of rubber rolls 180 and 181 spaced from gears 177 and 178 and mounted respectively on shafts 176 and 179 drive the canvas, rubber or equivalent sheet supporting conveyor belt, band or equivalent, 182, passing between said rolls. If desired, the supporting frames 5a and 5b may be slotted at 183 to receive bearings 184 and coiled springs 185, the latter exerting pressure on the bearings and thereby keeping the rolls 180 and 181 with the belt 182 therebetween in "wringing" contact (Fig. 7).

Belt 182 passes over an idler roll 186 disposed in the supporting frames 5a and 5b adjacent the wrapping machine W (Fig. 5) and from thence over an idler roll 187 supported in the arms f (Fig. 2). Supporting structures 182a are disposed beneath the belt to prevent sagging as it travels toward the wrapping machine W (Figs. 1 and 8). If desired, an arrangement for tightening belt 182 may be utilized, and as shown in Fig. 5, comprises a fixed idler roll 188 mounted on shaft 189 in the supporting frames 5a and 5b cooperating with an idler roll 190 supported in arms 191 and held adjustably in engagement with belt 182 by a suitable spring tension device 191a of a character well known in the art.

For bridging the gap between belts d and d1 and conveyor belt 182 a plurality of guiding fingers 192 are provided. If desired, other fingers or strippers 193 may be disposed between adjacent belts d and between belts d and d1 substantially in the plane of said belts (Fig. 2). In some cases, it is desirable that conveyor belt 182 be extended closely adjacent the wrapping machine W, but should this not be done, an arrangement for bridging the gap may be utilized, and as shown in Fig. 5, comprises a plate 193a disposed substantially in the plane of the upper surface of belt 182 and extending transversely of the unit C beneath the conveyor chains.

It is to be understood that the paper conveying belt 182 moves step-by-step in unison with and in the same direction as the sprocket chains carrying the gripper units G1, thereby forming a movable support for the glued sheets.

*Conveyor frame adjusting mechanism*

Oppositely threaded shanks 194 and 194a fixed respectively to supporting frames 5a and 5b engage corresponding oppositely threaded nuts 195 and 195a rotatable in bearings in the conveyor frames 9 (Figs. 3 and 8). Each nut carries a spiral gear 196 meshing respectively with spiral gears 197 keyed to shafts 198 supported in bearings 199 in the frames 9. Any suitable arrangement may be provided for rotating shafts 198 as hand wheels 200 fixed adjacent their ends (Figs. 1, 6, 7 and 8).

The operation is as follows:

Preferably a common base is provided for the three units, the machine W being placed thereon adjacent one end. The unit C is then arranged so that sheets will be fed beneath the upper form block structure w, positioned so that a vertical plane passed midway between and parallel to the supporting frames 5a and 5b will pass through the vertical longitudinal axis of the rod supporting said form block structure w. The adhesive applying unit G is then so positioned adjacent the other end of the unit C that the vertical plane passed midway between and parallel to the supporting frames 5a and 5b, as aforesaid, will form a continuation of a vertical plane passed midway between and parallel to the outer edges of the belt structure on the unit G. It is also to be understood that the upper surface of the belt structure on the unit G, the upper surface of the belts 182, and the upper surface of the lower form block or platen w1 when in its upper or box receiving position are substantially in horizontal alignment.

A box of the selected size will now be positioned upon an upper form block structure w of a size corresponding to the box and the form block structure w then will be passed slowly downward through the machine, meanwhile effecting an adjustment of the tools of the machine as well understood in the art and as described in our prior Letters Patent 1,541,036.

Adjustment of the conveyor frames 9 is now effected by rotation of hand wheels 200, the degree of adjustment being such that the free ends of bristles 105a are in vertical alignment with opposite side ends of the form block structure w, whereupon the conveyor frames 9 are locked in position by set screws 9b.

In order to effect an adjustment for the width of the sheets to be utilized, a sheet of the proper width is inserted in normal operating position under the upper form block structure w. The sheet holding plates are then adjusted until the forward edge of the sheet contacts with the vertical edges of slots 25e, whereupon screws 25e are tightened to hold the combined gripper release members and sheet holding plates in the selected position. Drive sprockets 18 are now released by loosening nuts 20 and the two chains 25 are rotated until the arms 32 come into releasing position beneath the cams 25s of the gripper release members 25c. It is to be understood that in effecting this adjustment, chains 25 are so manipulated that the respective gripper units G1 on the chains are maintained parallel to a vertical plane extending at right angles to the longitudinal axis of the conveyor frames 9. Adjustment having been effected, as aforesaid, nuts 20 are tightened thereby binding plugs 19 into engagement with their respective wheels. Thereafter, since units G1 are spaced equidistantly on their respective chains, sheets of the selected size will always be moved under the form block structure w and released at substantially the same point.

A box of the selected size is now placed on the box receiving plates 106 and the upper form block structure w lowered until centrally located therein. Box pusher bars 97 are loosened at the pin and slot connections 97a and the ends of the bars engaged with the edge of the box toward the conveyor unit C whereupon bars 97 are clamped at their respective pin and slot connections. Thereafter, bars 97 will function to move boxes of the selected size always into substantially the same position beneath the upper form block structure w.

The box release pins 63 are now adjusted to correspond to the depth of the selected box by extending the ends thereof slightly into the open box and tightening lock nuts 64. Corresponding adjustment of the stripper rods 65 is also effected at this time, the lower surface thereof being positioned slightly above the upper surface of the box and fixed in position by set screws 66. If the machine is being adjusted to feed boxes differing materially in depth from the type of boxes last used, it may be desirable to effect a rough adjustment of the stripper brush brackets 105 on plates 102 to conform substantially with the height of the selected box.

A stack of sheets corresponding in size to the selected sheet is now placed upon the table of the unit G and the guide members n are adjusted until in engagement with the stack edges and thereafter clamped in position by the set screw t.

After effecting adjustments of the character aforesaid, units G and W are placed in operation, the latter functioning to operate the conveyor unit C. Boxes are intermittently supplied by the box conveying belts 52, the feed thereof being controlled by release pins 63 which alternately rise and fall, thereby releasing individual boxes in timed relation with the wrapping unit W and positioning boxes under the upper form block structure w at the proper time in its cycle of operation. After releasing a box, the release pins 63 drop and prevent passage of a succeeding box until the next corresponding period in the cycle of operation.

The unit G, as stated, is continuously running, the feed of individual sheets, however, being effected at a predetermined period in the cycle of operation of the wrapping machine W and conveying unit C by the cam 40a, bell crank 40b, and associated parts.

When the unit G is tripped as stated above, a sheet is automatically started and passed through the various rolls to apply a coating of adhesive to one surface thereof. Thereafter the glued sheet is flattened upon the conveyor belts d and d1 by the presser wheels e, and the belts convey the sheet into the waiting pair of grippers G1. Thereupon, the gripper operating members 73 are released and the glued sheet is moved step-by-step toward the wrapping machine W, corresponding glued sheets subsequently being picked up by successive pairs of gripper units G1 in a similar manner.

Upon arrival of a glued sheet under the upper form block structure w, cams 25s on the gripper release members 25c actuate arms 32 of the units G1 to release the glued sheet now temporarily held in position in the suction slot 25g.

Meanwhile a box has been fed under the upper form block structure w, arriving at substantially the same time as does the glued sheet, the box being held above the sheet on the box receiving plates 106. The upper form block structure w now descends, enters the box, disengages the same from the receiving plates 106 and into engagement with the glued sheet whereupon the associated structure engages the lower form block or platen w1 and moves downwardly through the machine to perform the wrapping operation, as is well understood in the art.

The wrapped box in its upward course is stripped from the upper form block structure w by the rows of bristles 105a, whereupon the box falls upon the platen w1 from whence it is ejected by the rods 98.

Referring to our invention as illustrated in Figs. 31 to 35, there is shown an adhesive applying unit G2 and the end of a conveying or transferring unit C1 receiving gummed sheets from the unit G2 and effecting delivery thereof one by one to a wrapping machine (not shown).

As described aforesaid with respect to Fig. 1, the unit G2 may be generally of any suitable type capable of applying adhesive to sheets and is driven at suitable speed by any suitable source of power and operates to move single sheets in succession from the stack $a3$ of unglued sheets through the rotary feed roll mechanism designated generally at $b3$ and into engagement with the gluing roll $c3$ where there is applied, on one side thereof, any suitable adhesive, as glue. The sheets after being stripped and deflected from the glue roll $c3$ are flattened onto conveyor belts $d3$ and $d4$, not by the presser wheels as illustrated and described aforesaid, but by jets of air emitted from vertically extending nozzles $e3$ secured in the frame of the unit G2, air being forced under suitable pressure to the pipe $e4$ preferably through a flexible tube $e5$ by a pump (not shown).

It is to be understood that the conveyor mechanism of the unit G2, the arrangement for stripping and guiding glued sheets therefrom and passing them to the conveying unit C1, and the adjustable structure for receiving stacks of sheets of different sizes and centralizing a stack with respect to the conveying mechanism may be and preferably is substantially of the same character as specifically described aforesaid.

Further, it is to be understood that the conveying or transferring unit C1 may be and preferably is of the same general character as described aforesaid, although in the present instance an arrangement is provided for applying a fluid such as air, under pressure to the individual glued sheets at about the time of delivery to the said unit C1.

Referring to Figs. 31 to 35, sprocket chains $25k$ respectively carry sheet grippers G3 corresponding to grippers G1 previously described. Gripper operating members $73c$ pivotally mounted in the respective conveyor frames each carry laterally disposed studs $73d$ having openings extending longitudinally of the conveyor belt to receive shanks $73e$ adjustable in the studs $73d$ and held in adjusted position by set screws $73f$. Stop blocks $73g$ secured to shanks $73e$ respectively are provided with tails $73h$ in substantial alignment transversely of the conveyor frames with the vertical portions of gripper jaws 29 when open and waiting to receive a sheet, the tails $73h$ and said vertical portions arresting the oncoming glued sheet and cooperating with the gripper jaws, upon release of the members $73c$, when both move along the arcs of a circle toward the unit G2, to align the sheet transversely of the conveyor mechanism.

Stop block $73g$ is provided with a chamber $73i$ opening into a restricted nozzle-like opening $73j$, air under suitable pressure being applied to chamber $73i$ through a flexible tube $73k$ from a suitable air pump (not shown). When the members $73c$ move upwardly upon being released, jets of air issuing from the nozzles $73j$ serve to strip the glued sheet from tails $73h$ and further serve to hold the sheet against the guiding fingers $192a$ and strippers $193b$.

Pneumatic brake members $73m$ pivotally secured to stop blocks $73g$ by clamps $73n$ are adjustable vertically therein and each comprises a chamber $73o$ opening into an elongated slot $73p$, air being supplied under suitable pressure to the chamber $73o$ through a flexible tube $73q$ from a suitable air pump (not shown).

Air issuing from the pneumatic brake members cooperates with that issuing from the nozzles $73j$ to arrest the oncoming glued sheet and to prevent rebounding of the sheet after engaging the tails $73h$ and the vertical portions of the gripper jaws.

What we claim is:

1. In a system for applying wrappers to boxes including a wrapping machine, means for delivering wrapper sheets thereto in succession comprising a chain, wrapper-gripping mechanism carried by and movable with said chain, means operated in timed relation to said wrapping machine for opening and closing said gripping mechanism, a machine for delivering wrapper sheets to said gripping mechanism, and means controlled by said wrapping machine controlling operation of said wrapper-delivering machine.

2. Sheet conveying mechanism comprising a pair of chains, sheet gripping units each carried solely by respective chains and disposed in pairs aligned transversely of said chains, means for imparting equal intermittent movements to said chains, and means operative when said chains are at rest for controlling said sheet grippers to grip individual sheets.

3. In a system including a wrapping machine, sheet conveying mechanism comprising a chain, sheet grippers carried by said chain, means for imparting intermittent movement to said chain, means timed with said wrapping machine for controlling said sheet grippers to grip individual sheets at a receiving point, and means controlling said sheet grippers to effect release of said sheets at point of delivery to said wrapping machine.

4. In combination, sheet conveying mechanism comprising a chain, sheet gripping mechanism attached thereto and movable therewith for delivering a sheet to a predetermined point, means for imparting intermittent movement to said chain, and means adjustable with respect to said point for controlling said gripper mechanism to release a sheet at said point substantially immediately before said chain comes to rest.

5. In a system including a wrapping machine having form block structure, sheet conveying mechanism comprising a chain, sheet gripping mechanism attached thereto and movable therewith for delivering a sheet in the path of movement of said form block structure, and a cam adjustable with respect to said point for controlling said gripping mechanism to release a sheet when in registering relation with said form block structure.

6. In combination, sheet conveying mechanism comprising a chain, sheet gripping mechanism attached thereto and movable therewith for delivering a sheet to a predetermined point, means for controlling said gripping mechanism to release a sheet at said point, and pneumatic means for temporarily retaining the sheet at said point and adjustable with respect thereto.

7. In a system including a wrapping machine having form block structure, sheet conveying mechanism comprising a chain, sheet gripping mechanism attached thereto and movable therewith for delivering a sheet to a predetermined point in the path of movement of said form-block structure, and means adjustable with respect to said point for temporarily retaining a sheet delivered by said sheet gripping mechanism at said point.

8. In combination, sheet conveying mechanism comprising a chain, sheet gripping mechanism attached thereto and movable therewith for delivering a sheet to a predetermined point, a sheet holding plate adjustable with respect to said point, and pneumatic means for temporarily retaining a sheet delivered by said sheet gripping mechanism in engagement with said plate.

9. In combination, sheet conveying mechanism comprising a chain, sheet gripping mechanism attached thereto and movable therewith for moving a sheet to a predetermined point, a slotted sheet holding plate, and pneumatic means for retaining a released sheet stationary in said slot until removed therefrom by other mechanism.

10. In combination, sheet conveying mechanism comprising a chain, sheet gripping mechanism attached thereto and movable therewith for moving a sheet to a predetermined point, a slotted sheet holding plate adjustable with respect to said point, and pneumatic means for temporarily retaining a sheet in said slot.

11. In combination, sheet conveying mechanism comprising a chain, sheet gripping mechanism attached thereto and movable therewith for delivering a sheet to a predetermined point, means adjustable with respect to said point for controlling said gripping mechanism to release a sheet at said point, and means likewise adjustable with respect to said point for temporarily retaining a released sheet stationary at said point.

12. Sheet conveying mechanism comprising a pair of chains whose forward and return portions travel in substantially parallel paths, sheet gripping units carried by each chain and movable therewith, and means for imparting intermittent movements to said chains.

13. Sheet conveying mechanism comprising a pair of chains whose forward and return portions travel in substantially parallel paths, sheet gripping units carried by said chains and disposed in pairs aligned transversely of said chains, and means for imparting intermittent movements to said chains.

14. Apparatus for gripping a sheet, having thereon a coating in fluid state, comprising a supporting member, and co-acting members thereon movable relatively to each other for gripping sheets, one of said members being itself movable with respect to said supporting member to present to the coating of successive sheets different portions of its sheet engaging surface.

15. Sheet gripping apparatus comprising a movable supporting element, and co-acting fixed and movable members thereon, one of said members having a freely rotatable surface.

16. Sheet gripping apparatus comprising a movable supporting element, and co-acting fixed and movable members thereon, one of said members having a freely rotatable surface, and means biasing said members toward each other.

17. Sheet gripping apparatus comprising a movable supporting element, co-acting fixed and movable members thereon, one of said members having a freely rotatable surface, and spring means biasing said members toward each other.

18. Sheet gripping apparatus comprising a movable supporting element, co-acting fixed and movable members thereon, one of said members having a freely rotatable surface, and means biasing said members toward each other, said movable member having an actuating arm extending beyond said supporting element.

19. Sheet gripping apparatus comprising a movable supporting member, a freely rotatable disk carried thereby, and a member movable relatively to said disk also carried by said supporting member.

20. Sheet gripping apparatus comprising a supporting member, a freely rotatable disk carried thereby, a member movable relatively to said disk also carried by said supporting member, and means biasing said second mentioned member toward said disk.

21. Sheet gripping apparatus comprising a supporting member, a freely rotatable disk carried thereby, a member movable relatively to said disk also carried by said supporting member, and spring means biasing said second mentioned member toward said disk.

22. Sheet gripping apparatus comprising a supporting member, a freely rotatable disk carried thereby, and a member movable relatively to said disk and having a plane surface receiving the sheet.

23. Sheet gripping apparatus comprising a supporting member, a freely rotatable disk carried thereby, and a member movable relatively to said disk to stop the advanced edge of a moving sheet.

24. Sheet gripping apparatus comprising a horizontally extending supporting member, a freely rotatable edged disk carried thereby, and a member movable relatively to said disk to stop a moving sheet and having a plane horizontal surface receiving the sheet.

25. Sheet gripping apparatus comprising a supporting member, a freely rotatable edged disk carried thereby, a member having a plane surface movable relatively to said disk, and means for moving said plane surface toward said disk to grip a sheet.

26. Sheet gripping apparatus comprising a supporting member, a freely rotatable edged disk carried thereby, a member having a plane surface movable relatively to said disk, and a coiled spring for moving said plane surface toward said disk to grip a sheet.

27. Sheet gripping apparatus comprising a chain, a bracket carried by said chain, an edged disk rotatably mounted on said bracket, and a gripper palm pivoted to said chain.

28. Sheet gripping apparatus comprising a chain, a bracket carried by said chain, an edged disk rotatably mounted on said bracket, a gripper palm pivoted to said chain, and a spring between said disk and gripper palm.

29. Sheet gripping apparatus comprising a chain, a bracket carried by adjacent link pivots of said chain, an edged disk loosely mounted on said bracket, and a gripper palm pivoted to one of said link pivots.

30. Sheet gripping apparatus comprising a horizontally extending chain, a bracket carried by said chain, an edged disk loosely mounted on said bracket, and a gripper palm pivoted to said chain and having an arm extending above said chain and a palm horizontally beneath said disk.

31. Sheet gripping apparatus comprising a chain whose links are pivoted to each other, a rotatable disk carried by said chain, and a co-acting gripper palm pivotally mounted upon a pivot of said chain.

32. Sheet gripping apparatus comprising a chain whose links are pivoted to each other, a bracket carried by a pair of adjacent pivots of said chain, a disk carried by and rotatable with respect to said bracket, and a co-acting gripper palm rotatably mounted upon one of the pivots of said pair.

33. A conveyor unit comprising an intermittently movable conveyor member, abutments on said conveyor member disposed in pairs aligned transversely thereof, at least one abutment in each pair comprising a sheet gripper, and means for adjusting one abutment of each pair transversely of the conveyor member whereby sheets of different dimensions may be conveyed.

34. Apparatus of the character described comprising an intermittently movable conveyor member, abutments on said conveyor member disposed in pairs aligned transversely thereof, and conveyor belt structure adapted continuously to engage the uncoated face of an adhesive-coated wrapper during feeding of the wrapper toward said abutments while said conveyor member is at rest, and in the event the forward edge of the paper engages one abutment in advance of the other to swing the wrapper without deformation into engagement with the other abutment of the pair to effect alignment.

35. Apparatus of the character described comprising an intermittently movable conveyor member, abutments on said conveyor member disposed in pairs aligned transversely thereof, and conveyor belts operative while said conveyor member is at rest for feeding a sheet toward said abutments and slipping with respect thereto and effecting alignment of its forward edge with said abutments in event said sheet reaches one of them in advance of the other, at least one of said belts at its delivery end extending beyond the delivery end or ends of said other belt or belts toward said abutments.

36. Apparatus of the character described comprising an intermittently movable conveyor member, abutments on said conveyor member disposed in pairs aligned transversely thereof, and conveyor belts operative while said conveyor member is at rest for feeding a sheet toward said abutments and slipping with respect thereto and effecting alignment of its forward edge with said abutment in event said sheet reaches one of them in advance of the other, the centrally disposed belt at its delivery end extending beyond the delivery end of the other belts toward said abutment.

37. Apparatus of the character described comprising an intermittently movable conveyor member, abutments on said conveyor member disposed in pairs aligned transversely thereof, at least one abutment in each pair comprising a movable member of a sheet gripper engaged by the forward edge of a sheet, means for delivering a sheet in one direction toward said abutments, and means operative while said conveyor member is at rest for controlling said movable member of said sheet gripper to move it and said sheet in reverse direction.

38. Apparatus of the character described comprising an intermittently movable horizontally extending conveyor member, abutments on said conveyor member disposed in pairs aligned transversely thereof, at least one abutment in each pair comprising a pivoted member of a sheet gripper extending substantially vertically when the sheet gripper is in closed position, means operative while said conveyor member is at rest for opening said sheet gripper and moving said pivoted member in one direction, means for delivering a sheet in one direction toward said abutments, and means operative while said conveyor member is still at rest for closing said sheet gripper and moving said pivoted member and said sheet in reverse direction.

39. Apparatus of the character described comprising an intermittently movable conveyor member, abutments on said conveyor member disposed in pairs aligned transversely thereof, at least one abutment in each pair comprising a pivoted member of a sheet gripper engaged by the forward edge of a sheet, means operative while said conveyor member is at rest for opening said sheet gripper and moving said pivoted member in one direction, said means comprising a pivoted stop member aligned transversely with said pivoted member, means for delivering a sheet in said one direction toward said abutments and stop member, and means operative while said conveyor member is still at rest for closing said sheet gripper to move said pivoted member, stop member, and sheet in reverse direction.

40. Apparatus of the character described comprising an intermittently movable conveyor member, abutments on said conveyor member disposed in pairs aligned transversely thereof, at least one abutment in each pair comprising a pivoted member of a sheet gripper engaged by the forward edge of a sheet, means operative while said conveyor member is at rest for opening said sheet gripper and moving said pivoted member in one direction, said means comprising a pivoted stop member aligned transversely with said pivoted member, means for delivering a sheet in said one direction toward said abutments and stop member, means operative while said conveyor member is still at rest for closing said sheet gripper and moving said pivoted member, stop member, and sheet in reverse direction, and means for directing a jet of air onto said sheet as said sheet gripper closes.

41. Apparatus of the character described comprising an intermittently movable chain, sheet gripper mechanism carried by said chain comprising a palm engaged by one surface of the sheet, a trough, means operative while said chain is at rest for opening said sheet gripper mechanism to position the palm in said trough, and means for delivering a sheet along said trough.

42. Apparatus of the character described comprising an intermittently movable horizontally extending chain, sheet gripping mechanism carried by said chain comprising a horizontally extending palm engaged by the sheet, a trough, means operative while said chain is at rest for opening said sheet gripping mechanism to lower the palm into said trough, and means for delivering a sheet along said trough above the depressed palm.

43. Apparatus of the character described comprising an intermittently movable chain, sheet gripping mechanism carried by and movable with said chain, means for feeding a sheet to said gripping mechanism while in sheet receiving position, and means for applying a retarding force to said sheet as it approaches said gripping mechanism.

44. Apparatus of the character described comprising an intermittently movable chain, sheet gripping mechanism carried by and movable with said chain, means for feeding a sheet to said gripping mechanism while in sheet receiving position, and pneumatic means for applying a retarding force to said sheet as it approaches said gripping mechanism.

45. Apparatus of the character described comprising an intermittently movable chain, sheet gripping mechanism carried by and movable with said chain, means for feeding a sheet to said gripping mechanism while in sheet receiving position, and means for retarding the sheet as it approaches said sheet gripping mechanism comprising a nozzle directing a jet of air transversely to the direction of sheet movement.

46. Apparatus of the character described comprising an intermittently movable chain, sheet gripping mechanism carried by and movable with said chain, means for feeding a sheet to said gripping mechanism while in sheet receiving position, stop mechanism for the sheet, means for moving said stop mechanism out of the path of said sheet, and means for stripping the sheet therefrom.

47. Apparatus of the character described comprising an intermittently movable chain, sheet gripping mechanism carried by and movable with said chain, means for feeding a sheet to said gripping mechanism while in sheet receiving position, stop mechanism for the sheet, means for moving said stop mechanism out of the path of said sheet, and pneumatic means for stripping the sheet therefrom.

48. Apparatus of the character described comprising an intermittently movable chain, sheet gripping mechanism carried by and movable with said chain, means for feeding a sheet to said gripping mechanism while in sheet receiving position, stop mechanism for the sheet, means for moving said stop mechanism out of the path of said sheet, and means directing a jet of air onto said sheet as said stop mechanism moves.

49. Apparatus of the character described comprising an intermittently movable chain, sheet gripping mechanism carried by and movable with said chain, means operative when said chain is at rest for opening said gripping mechanism, and stop mechanism movable with said last mentioned means.

50. Apparatus of the character described comprising an intermittently movable chain, sheet gripping mechanism carried by and movable with said chain, means operative when said chain is at rest for opening said gripping mechanism, stop mechanism movable with said last mentioned means, and pneumatic means for stripping the sheet from said stop mechanism.

51. Apparatus of the character described comprising an intermittently movable chain, sheet gripping mechanism carried by and movable with said chain, means operative when said chain is at rest for opening said gripping mechanism, stop mechanism movable with said last mentioned means, and pneumatic means likewise movable with said last mentioned means for stripping the sheet therefrom.

52. Apparatus of the character described comprising an intermittently movable chain, sheet gripping mechanism carried by and movable with said chain, means operative when said chain is at rest for opening said gripping mechanism, stop mechanism movable with said last mentioned means, and means likewise movable with said last mentioned means for directing a jet of air onto said sheet.

53. Apparatus of the character described comprising an intermittently movable chain, sheet gripping mechanism carried by and movable with said chain, means for feeding a sheet to said gripping mechanism while in sheet receiving position, means for retarding the sheet as it approaches said sheet gripping mechanism, stop mechanism for the sheet, means for moving said stop mechanism out of the path of said sheet, and means for stripping the sheet from said stop mechanism.

54. Apparatus of the character described comprising an intermittently movable chain, sheet gripping mechanism carried by and movable with said chain, means for feeding a sheet to said gripping mechanism while in sheet receiving position, means for retarding the sheet as it approaches said sheet gripping mechanism, stop mechanism for the sheet, means for moving said stop mechanism out of the path of said sheet, and means comprising said second mentioned means for stripping the sheet from said stop mechanism.

55. Apparatus of the character described comprising an intermittently movable chain, sheet gripping mechanism carried by and movable with said chain, means for feeding a sheet to said gripping mechanism while in sheet receiving position, means for directing a jet of air onto said sheet as it approaches said sheet gripping mechanism, stop mechanism for the sheet, means for moving said stop mechanism out of the path of movement of said sheet, and means for directing another jet of air onto said sheet during movement of said stop mechanism.

56. Apparatus of the character described comprising an intermittently movable chain, sheet gripping mechanism carried by and movable with said chain, means operative when said chain is at rest for opening said gripping mechanism, and stop and stripper mechanism carried by and movable with said last mentioned means.

57. Apparatus of the character described comprising an intermittently movable longitudinally extending chain, sheet gripping mechanism carried by and movable with said chain, means operative when said chain is at rest for opening said gripping mechanism, and stop and stripper mechanism carried by said last mentioned means and adjustable thereon in the direction of movement of said chain.

58. Apparatus of the character described comprising an intermittently movable chain, sheet gripping mechanism carried by and movable with said chain, means operative when said chain is at rest for opening said gripping mechanism, and nozzle structure carried by said last mentioned means.

59. Apparatus of the character described comprising an intermittently movable longitudinally extending chain, sheet gripping mechanism carried by and movable with said chain, means operative when said chain is at rest for opening said gripping mechanism, and nozzle structure carried by said last mentioned means and adjustable thereon in the direction of movement of said chain.

60. Conveying mechanism comprising a sheet conveying member, a sheet gripper carried by said member, means for automatically opening and closing said gripper, and means for manually opening said gripper when gripping a sheet.

61. Conveying mechanism comprising a sheet conveying member, sheet grippers carried by said member and spaced from each other in the path of movement of said member for gripping and conveying sheets in succession, means for automatically controlling said grippers in succession, and means for manually controlling a plurality of said grippers to effect simultaneous release of the sheets gripped thereby.

62. Apparatus of the character described comprising a slotted sheet holding plate, means for moving a sheet into said slot, and pneumatic means for temporarily retaining the sheet in said slot.

63. The combination with conveyor mechanism comprising a frame carrying sheet transporting mechanism and means for adjusting said frame transversely of the direction of sheet movement, of a support for a stack of sheets, a guide arm associated with said support for confining the stack and having a predetermined position with respect to said frame, and means for adjusting said guide arm in said direction.

64. The combination with conveyor mechanism comprising frames carrying sheet transporting mechanism and means for adjusting said frames transversely of the direction of sheet movement, of a support for a stack of sheets, guide arms associated with said support for confining the stack and having predetermined positions with respect to the respective frames, and means for adjusting said guide arms in said direction.

65. The combination with conveyor mechanism comprising frames carrying sheet transporting mechanism and means for adjusting said frames toward or from each other transversely of the direction of sheet movement, of a support for a stack of sheets, guide arms associated with said support for confining the stack and having predetermined positions with respect to the respective frames, and means for adjusting said guide arms toward or from each other in said direction.

66. The combination with conveyor mechanism comprising frames carrying sheet transporting mechanism and means for adjusting said frames toward or from each other transversely of the direction of sheet movement, of a support for a stack of sheets, guide arms associated with said support for confining the stack and having predetermined positions with respect to the respective frames, means for adjusting said guide arms toward or from each other in said direction, and means for securing the guide arms in adjusted position.

67. The combination with conveyor mechanism comprising frames carrying sheet transporting mechanism and means for simultaneously adjusting said frames toward or from each other transversely of the direction of sheet movement, of a support for a stack of sheets, guide arms associated with said support for confining the stack and having predetermined positions with respect to the respective frames, and means for simultaneously adjusting said guide arms toward or from each other in said direction.

68. In an adhesive applying unit, sheet conveying belts for delivering adhesive-coated sheets in succession, rollers over which said belts travel, at least one belt at its delivery end extending beyond the delivery end of the other belt or belts.

69. In an adhesive applying unit, sheet conveying belts for delivering adhesive-coated sheets in succession, rollers over which said belts travel, the centrally disposed belt at its delivery end extending beyond the delivery end of the other belts.

70. The combination with a machine for delivering wrapper sheets in succession and comprising a sheet conveying belt and rollers over which said belt travels, of a support carried by said machine, a roller carried by said support, and a second belt passing over said roller and whose delivery end extends beyond the delivery end of said first named belt.

71. The combination with a machine for delivering wrapper sheets in succession and comprising a sheet conveying belt and rollers over which said belt travels, of a support carried by said machine, a roller carried by said support, a second belt passing over said roller and whose delivery end extends beyond the delivery end of said first named belt, and wrapper sheet conveying mechanism comprising a traveling member, and sheet gripping mechanism carried by said member, said second named belt delivering to said gripping mechanism.

72. In combination, means for delivering sheets in succession comprising a plurality of sheet conveying belts, conveyor belt structure in alignment therewith receiving sheets, and a stripper finger between said belts first mentioned and extending toward said conveyor belt structure.

73. In combination, means for delivering sheets in succession comprising a plurality of sheet conveying belts, conveyor belt structure in alignment therewith receiving sheets, guiding fingers between the two belt structures, and a stripper finger between said belts first mentioned.

74. In a system for applying wrappers to boxes including a wrapping machine, means for delivering wrappers in succession to said wrapping machine comprising a chain, a plurality of wrapper-gripping mechanisms carried by and movable with said chain, and means effecting opening of gripper mechanism to receive a sheet while substantially simultaneously another gripper mechanism is opened to release a sheet at point of delivery to said wrapping machine.

75. In a system for applying wrappers to boxes including a wrapping machine, means for simultaneously transporting a plurality of wrapper sheets and delivering them in succession to said wrapping machine comprising a chain, a plurality of wrapper-gripping mechanisms carried by and movable with said chain, and means effecting opening of gripper mechanism to receive a sheet while substantially simultaneously other gripper mechanism is open to deliver a sheet to said wrapping machine.

76. In a system for applying wrappers to boxes including a wrapping machine, means for delivering wrappers in succession to said wrapping machine comprising a chain, a plurality of wrapper-gripper mechanisms carried by and movable with said chain, means operating in timed relation to said wrapping machine effecting intermittent movement of said chain, and means operating in timed relation of said wrapping machine effecting opening of gripper mechanism to receive a sheet while said chain is at rest and other gripper mechanism is open to release a sheet at point of delivery to said wrapping machine.

77. In a system including a wrapping machine having reciprocating form block structure, a conveyor unit for delivering wrappers into the path of movement of said form block structure comprising a pair of parallel chains disposed on opposite sides of and extending the point of delivery to said form block structure, wrapper-gripper mechanisms carried by said chains, means moving said chains in timed relation to said form block structure to effect step-by-step movement of wrappers to said point of delivery, means for adjusting said chains transversely of the direction of movement thereof, and gripper release means positioned adjacent said form block structure adjustable in the direction of movement of said chains, the transverse adjustment of said chains and the adjustment of said gripper release means effecting registering relation between said form block structure and wrappers of different dimensions as delivered thereto.

78. Apparatus of the character described comprising a chain, a support therefor, sheet gripping mechanism carried by and movable with said chain, means effecting intermittent movement of said chain, means carried by said support operative while said chain is at rest to open said sheet gripping mechanism, and means for adjusting said support transversely of the direction of movement of said chain.

79. Apparatus of the character described comprising an intermittently movable conveyor member, abutments on said conveyor member disposed in pairs aligned transversely, at least one abutment of each pair comprising sheet gripper mechanism, conveyor belt structure operative while said conveyor is at rest for feeding a sheet toward said abutments, and in the event the forward edge of the sheet engages one abutment in advance of the other to swing the wrapper into engagement with the other abutment of the pair to effect alignment, and means operative while said conveyor is still at rest for controlling said sheet gripper mechanism to grip the aligned sheet.

80. Conveying mechanism for adhesive coated wrapper sheets comprising a conveyor member, sheet grippers on said conveyor member disposed in pairs aligned transversely thereof, each pair of grippers engaging the forward end of an adhesive coated wrapper, and means operable when said conveyor member is stopped for simultaneously releasing a plurality of sheets by opening at least two pairs of said grippers to permit removal of said adhesive coated sheets.

81. In a system for applying wrappers to boxes including a wrapping machine, means comprising a chain for transporting wrapper sheets from a receiving point to a delivery point at which they are released from said chain for application to a box by said wrapping machine, wrapper gripping mechanism carried by and movable with said chain, and means operated in timed relation to said wrapping machine for opening and closing said gripping mechanism at one of said points independently of movement of said chain.

82. In combination, a chain forming an endless loop, a sheet-receiving station at one end of said loop, a sheet-delivery station at the opposite end of said loop, gripper mechanism carried by and movable with said chain, means for operating said mechanism to grip a sheet at said one end of said loop for travel with the lower portion thereof, means for operating said mechanism to release a sheet at said opposite end of said loop, and a belt forming a loop having its upper portion movable in the same direction as and concurrently with the lower portion of said chain loop and extending for a substantial distance between said stations for supporting a sheet during said movement with said chain.

83. Conveyor belt structure for receiving sheets stripped from an adhesive-applying roll by sheet stripping means, pneumatic means for effecting preponderance of pressure on the coated surface of the sheets disposed adjacent said sheet-stripping means to flatten the leading edge of each sheet onto the belt structure as it is stripped from said adhesive applying roll by said stripping means, a second conveyor comprising gripper mechanism for the leading edge of a coated sheet at the delivery end of said conveyor belt structure, and means for effecting alternate operation of said conveyor belt structure and said second conveyor.

84. In combination, conveyor belt structure for transporting sheets on the upper side thereof, a second endless conveyor having sheet-gripper mechanism for engaging the leading end of a sheet at the delivery end of said conveyor belt structure, endless belt structure disposed beneath said second conveyor for supporting sheets engaged by said gripper-mechanism thereof, and guide structure bridging the gap between said conveyor belt structure and said supporting belt structure and disposed beneath said second conveyor.

THEODORE A. FEDERWITZ.
WALTER T. BAILEY.

CERTIFICATE OF CORRECTION.

Patent No. 1,893,736.  January 10, 1933.

THEODORE A. FEDERWITZ, ET AL.

It is hereby certified that error appears in the printed specification of the above numbered patent requiring correction as follows: Page 3, line 13, strike out the word "additional"; line 20, for "in" first occurrence read "is"; line 48, for "wheen" read "wheel"; line 97, for "an" read "on"; and line 98, before "an" insert the word "support"; page 5, line 81, for "frames" read "frame"; page 6, line 4, after "also" insert "form"; page 8, line 60, for "necessarly" read "necessarily"; page 17, line 5, claim 76, for "of" read "to"; and that the said Letters Patent should be read with these corrections therein that the same may conform to the record of the case in the Patent Office.

Signed and sealed this 9th day of May, A. D. 1933.

(Seal)  M. J. Moore
Acting Commissioner of Patents.